United States Patent [19]

Gmeiner et al.

[11] Patent Number: 5,520,432
[45] Date of Patent: May 28, 1996

[54] MOTOR VEHICLE WITH A LOWERABLE ROOF CONSTRUCTION

[75] Inventors: Guenter Gmeiner, Sindelfingen; Arno Jambor, Vahingen/Enz; Guenther Ellenrieder, Ostfildern; Dieter Guertler, Stuttgart; Oliver Wagner, Filderstadt; Roland Wendler, Boeblingen, all of Germany

[73] Assignee: Mercedes-Benz AG, Stuttgart, Germany

[21] Appl. No.: 263,334

[22] Filed: Jun. 21, 1994

[30] Foreign Application Priority Data

Jun. 21, 1993 [DE] Germany .......................... 43 20 468.6

[51] Int. Cl.⁶ ....................................................... B60J 7/12
[52] U.S. Cl. ............................ 296/107; 296/108; 296/117
[58] Field of Search ...................................... 296/107, 108, 296/116, 117, 121, 122

[56] References Cited

U.S. PATENT DOCUMENTS

| | | | |
|---|---|---|---|
| 1,298,387 | 3/1919 | Porcher | 296/117 |
| 2,770,489 | 11/1956 | Garvey et al. | 296/117 |
| 2,939,742 | 6/1960 | Dardarian et al. | |
| 2,947,570 | 8/1960 | Noe | 296/117 |
| 3,375,037 | 3/1968 | Hunt | |
| 4,784,428 | 11/1988 | Moy et al. | 296/122 |
| 4,854,634 | 8/1989 | Shiraishi et al. | |

FOREIGN PATENT DOCUMENTS

| | | |
|---|---|---|
| 0530134 | 3/1993 | European Pat. Off. |
| 733380 | 10/1932 | France |
| 3806647 | 7/1989 | Germany |
| 3903358 | 8/1990 | Germany ............................... 296/108 |
| 4010276 | 10/1990 | Germany |

*Primary Examiner*—Dean Kramer
*Attorney, Agent, or Firm*—Evenson, McKeown, Edwards & Lenahan

[57] ABSTRACT

A motor vehicle with a lowerable roof construction, particularly a convertible sports car, has a roof part and a rear part as well as a forced control device for controlling the relative movement of the roof part with respect to the rear part. The forced control device has at least one control element which is connected in the region of the roof swivel axis in a rotationally fixed manner to the roof part and interacts with at least one further control element which is fixed to the body of the vehicle and is in the region of the rear swivel axis.

10 Claims, 22 Drawing Sheets

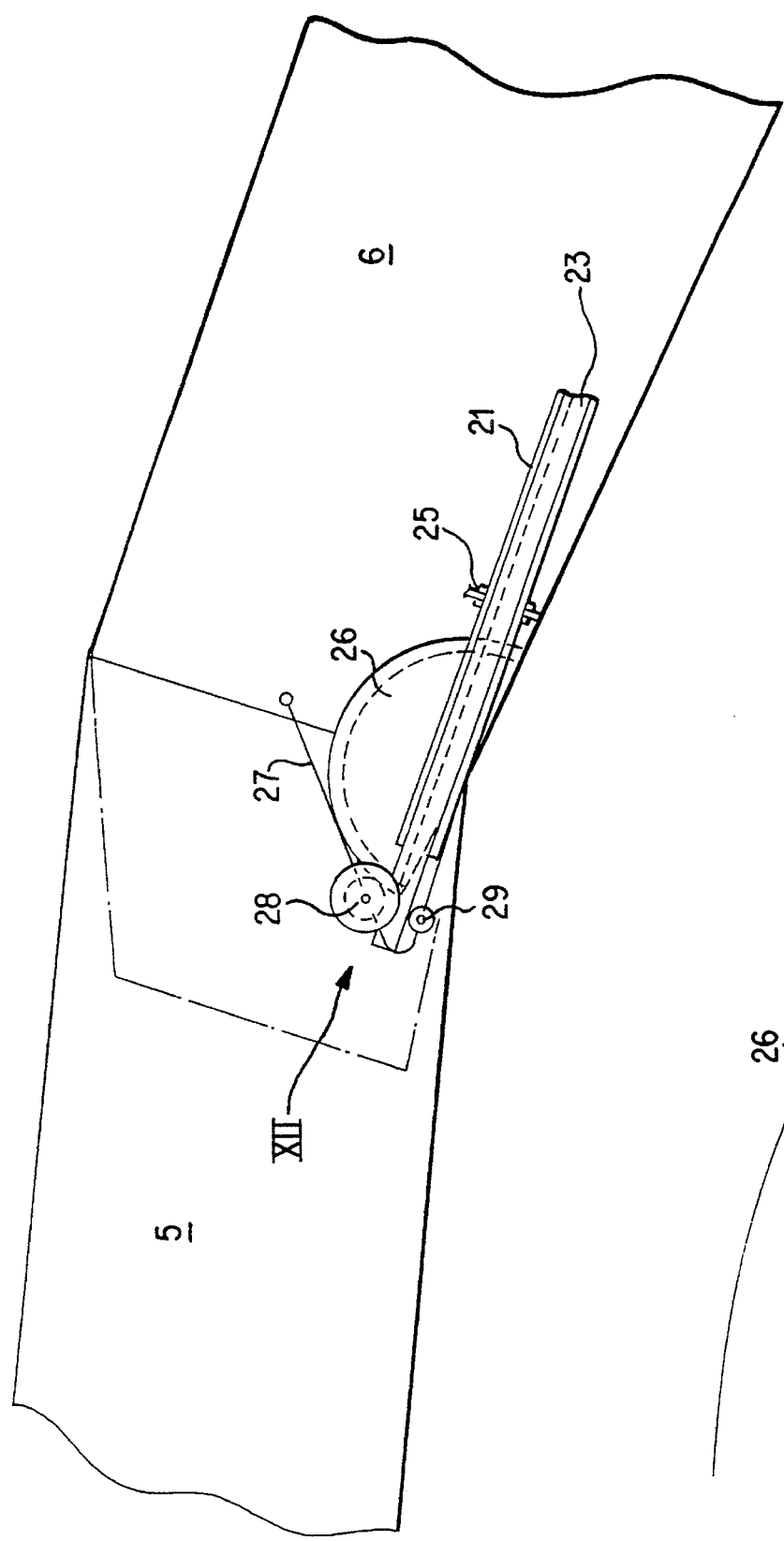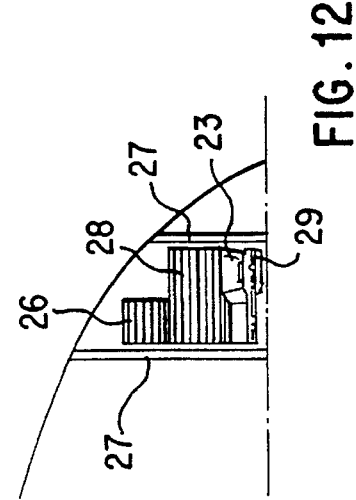

MOTOR VEHICLE WITH A LOWERABLE ROOF CONSTRUCTION

BACKGROUND AND SUMMARY OF THE INVENTION

The invention relates to a motor vehicle with a lowerable roof construction and, more particularly, to a motor vehicle with a lowerable roof construction having at least a roof part and a rear part. The roof part is swivellable about a roof swivel axis of the rear part by means of a forced control device in a defined relative movement with respect to the rear part. The rear part is able to swivel about a rear swivel axis which is fixed to the vehicle.

In the case of a motor vehicle according to German Patent document DE 40 10 276 A1, it is known to lower a roof construction, having a roof part and a rear part, into a space located behind the motor vehicle passenger compartment. This space is closed by a covering flap. In this case, the roof part serves for closing a remaining roof opening between a rigid rollover frame. The rear part serves for closing a rear window opening remaining between the lateral frame parts. The roof part is connected by hinges at its rear edge region—viewed in the travelling direction of the vehicle—to the upper edge of the rear part. This is done so that the roof part can be swivelled in relation to the rear part. Consequently, the roof swivel axis of the roof part is located on the rear part transversely with respect to the longitudinal axis of the vehicle. The rear part itself is able to swivel about a rear swivel axis fixed to the body of the vehicle. The roof part is guided in the region of its front edge by guide elements in guide rails of the lateral frame parts. These guide elements are coupled to the swivel drive of the rear part so that when the rear part swivels, the roof part is in each case swivelled along with it in a defined relative movement. For a motor vehicle in which the entire roof structure is lowered behind the vehicle seats of the passenger compartment, so that a true convertible is produced, this forced control of the relative movement of the roof part and rear part is not suitable. In the case of such a convertible motor vehicle, there are no lateral frame parts in which the roof part could be guided.

There is therefore needed a motor vehicle of the above-mentioned type in which the roof construction is able to be lowered completely in a manner which corresponds with a true convertible, while nevertheless ensuring a defined relative movement between the roof part and the rear part when the roof construction swivels.

These needs are met according to the present invention by providing a forced control device having at least one control element. The control element is connected in the region of the roof swivel axis in a rotationally fixed manner to the roof part and interacts with at least one further control element which is fixed to the bodywork in the region of the rear swivel axis. The forced control of the relative movement of the roof part and the rear part of the roof construction, i.e., a two-part hardtop, ensures that no uncontrolled movements can occur during opening and closing of the roof. This forced control has the advantage that gusts of wind or inadvertently driving with a roof which, although closed, is unlocked, cannot result in any damage. In addition, the roof construction can be handled in a simple and obvious manner, so that operating instructions can be minimized.

In a preferred embodiment of the invention, the rear part in the region of the rear swivel axis is assigned a torque-compensating mechanism for producing a defined torque characteristic during the swivelling movement of the roof construction. As a result, the swivelling of the roof construction can take place by a defined torque characteristic, so that compensation for the weight of the roof construction occurs independently of the respective swivel position.

In a further preferred embodiment of the invention, a pull rope which acts on the rear part at a distance from the rear swivel axis is provided. The pull rope has a spring characteristic and is articulated in a manner such that it is fixed to the vehicle. The pull rope is deflected by a contoured pulley which is rotationally fixed to the rear part and maintains a perpendicular distance between a line of spring force action of the pull rope and the rear swivel axis during the swivelling operation of the rear part. In this case, the contour of the contoured pulley is determined by the spring force and by the perpendicular distance between the line of spring force action and the rear swivel axis required for the torque to be applied.

In a yet further embodiment of the present invention, the control elements of the roof part and the rear part are frictionally or positively interconnected by an endless rope pull or chain pull. Swivelling of the rear part therefore inevitably effects a corresponding swivelling of the roof part about the roof swivel axis of the rear part.

In a still further embodiment of the invention, at least one control element has a roller which is movable about an axis of rotation parallel to the roof swivel axis. The roller is offset by a small distance into the rear part and is connected by means of a lever linkage in a rotationally fixed manner to the roof part. This roller is likewise connected by means of a rope pull or chain pull to the control element which is fixed to the body work and is on the rear swivel axis.

In a yet still further embodiment of the invention, the control elements of the roof part and of the rear part are connected by a rack-and-pinion drive which absorbs tensile and compressive loads.

A further embodiment of the invention, provides at least one crank arm mounted at a distance from the rear swivel axis in a manner such that it is fixed to the bodywork. The free end of the crank arm acts at a distance from the roof swivel axis on a lever continuation connected rigidly to the roof part.

In another embodiment of the present invention, two swivelling side parts of the roof construction, in particular two rear side windows, which can be lowered together with the roof construction, are coupled by a coupling device to the swivelling movement of the rear part of the roof construction. The swivelling-in of the side parts of a lowerable roof construction in a motor vehicle is already known from German Patent document DE 39 03 358 A1. In this case the side parts are held in slotted link guides of the roof part and are swivelled inward during the substantially horizontal displacing of the roof part. However, in the case of the present invention, such slotted-link guides in the roof part are not necessary. The swivelling-in and out of the side parts is advantageously derived from the swivelling movement of the rear part.

In a further embodiment of the invention, each side part is held on a swivel arm at a distance from its swivel axis. The swivel arm is mounted rotatably about its swivel axis in a mounting fixed on the rear part of the roof construction. In a further embodiment, a coupling element, which is articulated in a manner such that it is fixed to the bodywork, is coupled to the swivel arm and turns the swivel arm in dependence on the opening or closing movement of the rear part. Consequently, a forced control of the relative movement between the side part and the rear part is achieved.

This forced control is achieved in the case of a further embodiment of the invention by the swivel axis of the swivel arm being assigned a coupling element which interacts positively or frictionally with a counter-element which is fixed to the bodywork and is coaxial with the rear swivel axis.

Other objects, advantages and novel features of the present invention will become apparent from the following detailed description of the invention when considered in conjunction with the accompanying drawings.

BRIEF DESCRIPTION OF THE DRAWINGS

FIG. 11 is an enlarged representation of parts of the forced control according to FIGS. 8 to 10 in the connecting region between the roof part and the rear part;

FIG. 12 is a view of the enlarged region of FIG. 11 taken in the direction of arrow XII according to FIG. 11;

DETAILED DESCRIPTION OF THE DRAWINGS

Figure 1:
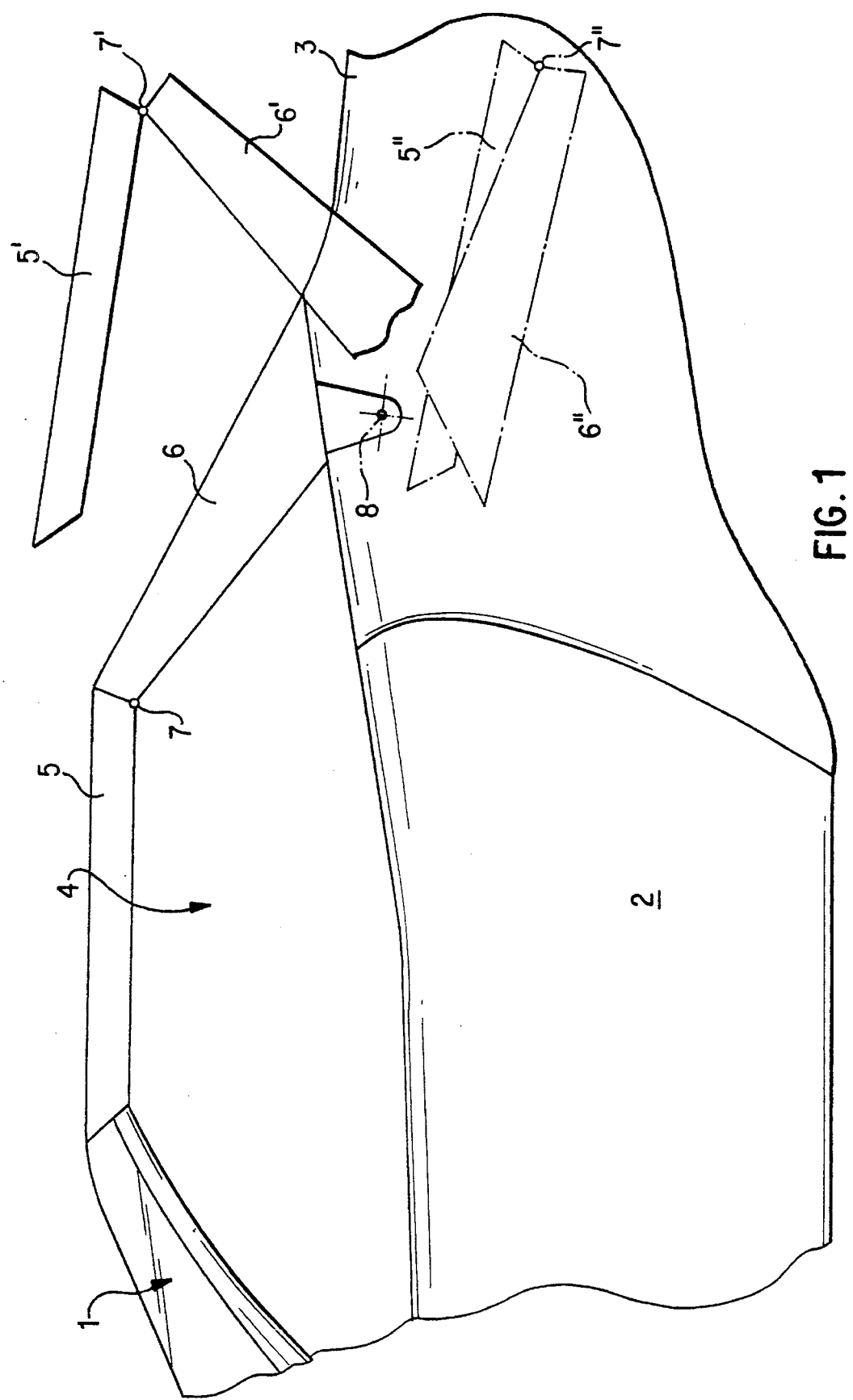
FIG. 1 is a schematic diagram representation showing a cutout of a motor vehicle according to the present invention, which includes a roof construction which has a roof part and a rear part and can be lowered in a rear region of a motor vehicle, several swivelling positions of the roof construction being diagram matically represented.

The motor vehicle schematically partially shown in FIG. 1 is a roadster, which has two side doors 2 and a passenger compartment 4. The passenger compartment 4 is bounded towards the front by a front window 1. Towards the top and towards the rear, the passenger compartment 4 is bounded by a roof part 5 and a rear part 6 of a roof construction. The rear part 6 is provided with a rear window (not shown). Roof part 5 and rear part 6 are able to be lowered, either manually or by means of a drive mechanism, behind the passenger compartment 4 into a stowing space (not shown) located in a rear region 3 of the motor vehicle. For this purpose, the rear part 6 can be swivelled about a rear swivel axis 8 fixed to the bodywork. Rear part 6 and roof part 5 are interconnected by means of hinges in the region of a roof swivel axis 7. The roof part 5 is swivel-movable in relation to the rear part 6 about the roof swivel axis 7. Both the roof part 5 and the rear part 6 have a rigid structure, so that the roof construction formed is a hardtop. Roof part 5 and rear part 6 can be positioned in a position in the rear region 3 folded together about the roof swivel axis 7. The positions 5', 6', 7' shown in FIG. 1 represent the partially opened or closed position of the roof construction. The positions 5", 6", 7" represent the position of the roof construction when lowered completely into the rear region 3.

Figure 3:
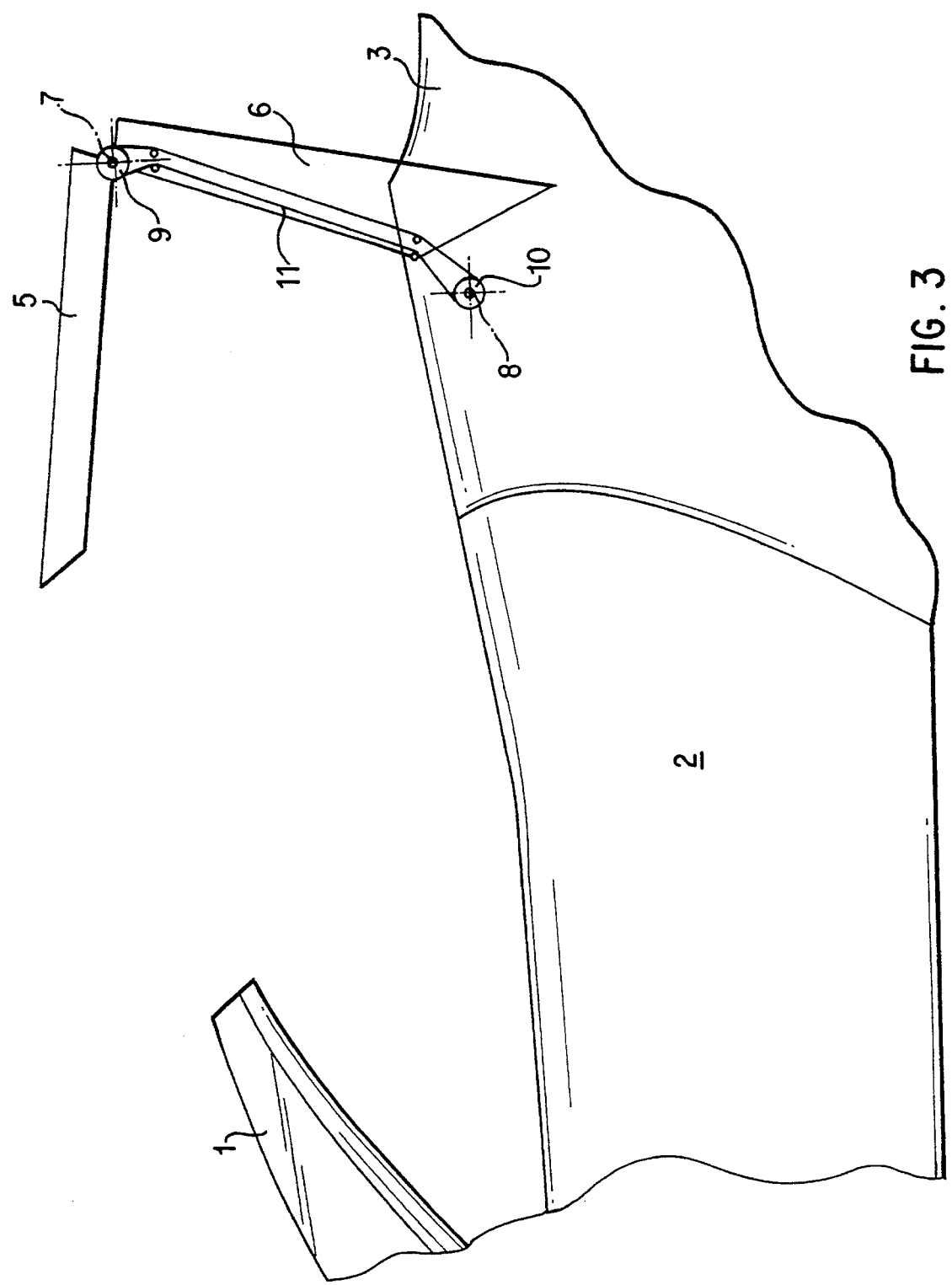

Referring to FIG. 3, in order to achieve a forced control of the relative movement between roof part 5 and rear part 6, an endless rope pull 11 is laid between two rollers 9, 10, in each case representing control elements. In this case, the roller 10 is arranged in a manner such that it is fixed to the bodywork and is coaxial with the rear swivel axis 8. The roller 9 is connected to the roof part 5 in a manner such that it is rotationally fixed and coaxial with the roof swivel axis 7. In order to prevent frictional coupling of the rollers 9 and 10, and consequently a slippage of the rope pull 11, and further to ensure rope guidance within the pillar contour of the rear part 6, the rope pull 11 is deflected by a plurality of tension rollers 12. In order to achieve a uniform relative movement of the roof part 5 and the rear part 6, such a rope pull 11, including the associated rollers 9 and 10, is provided on each side of the roof construction. Any slippage of the rope pull 11 can be completely prevented if the rope pull 11 is fixed by a retaining screw (not shown) in each case on the circumference of the rollers 9, 10 wrapped around by it.

In the case of a design which is not shown, a chain pull is provided instead of the rope pull 11 and the rollers 9 and 10 are designed as corresponding chain wheels. The forced control therefore does not take place frictionally but rather positively.

Figure 4:
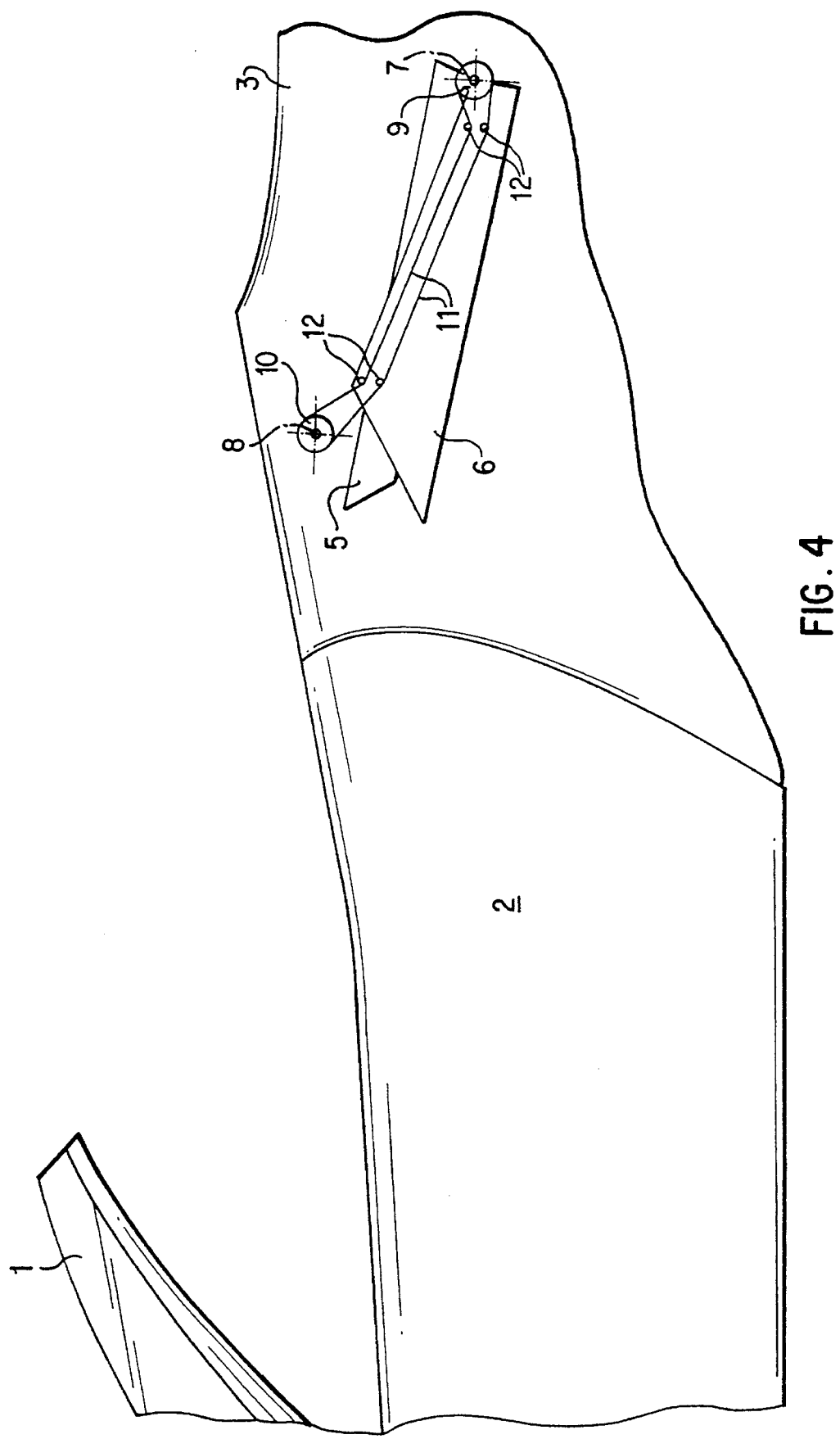

As can be seen from FIGS. 3 and 4, when the rear part 6 swivels due to the forced control by means of the rope pull 11, there automatically takes place a defined swivelling of the roof part 5 in relation to the rear part 6. This results from the fact that the roller 10 is attached in a manner such that it is fixed to the bodywork and therefore does not join in the swivelling movement of the rear part 6. The forced control via the rope pull 11 is matched to the swivelling angle of the rear part 6 about the rear swivel axis 8 such that the roof part 5 assumes the end position represented in FIG. 4 when the rear part 6 is in the open end position.

Figure 2:
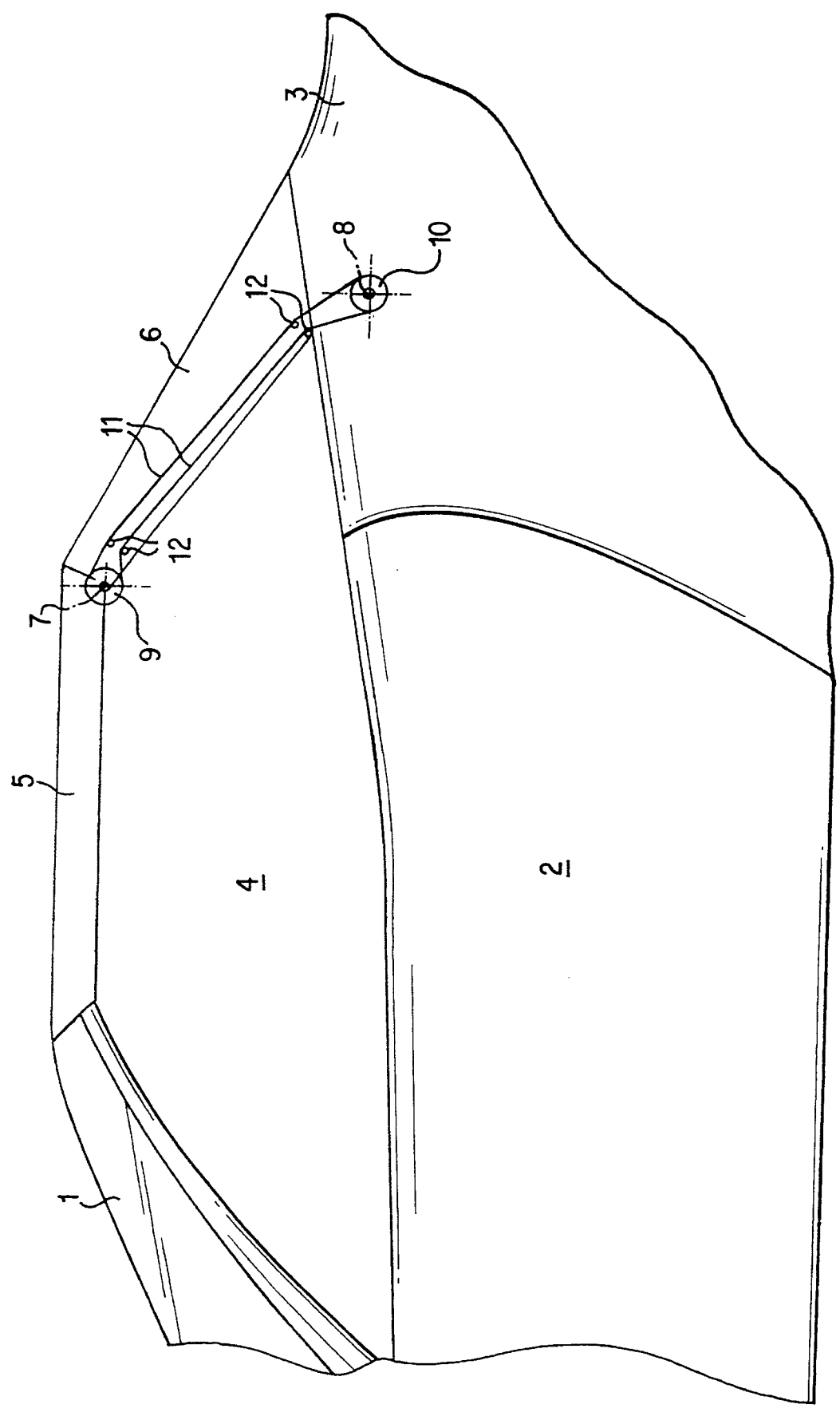
FIGS. 2–4 are schematic diagrams showing a further design of a motor vehicle similar to FIG. 1, in which the roof part and the rear part are intercoupled by an endless rope pull for a positively controlled relative movement. The closed position of the roof construction is represented in FIG. 2. The partially opened position of the construction is represented in FIG. 3. The fully opened position of the said construction is represented in FIG. 4.
Figure 5:
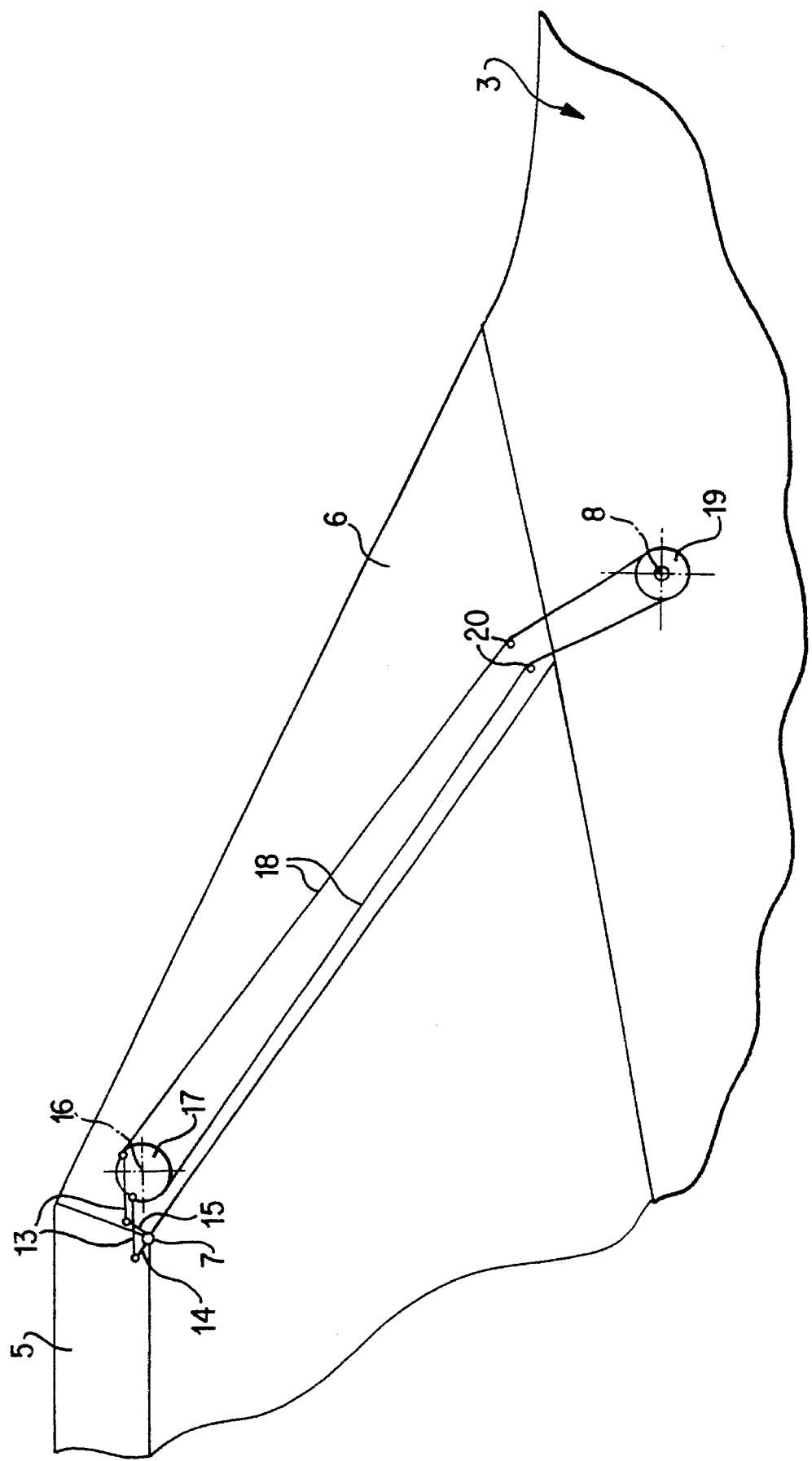
FIGS. 5–7 show a further embodiment of a motor vehicle with a roof construction similar to FIGS. 2 to 4, which similarly represent the various opening positions of the roof part and the rear part.
Figure 6:
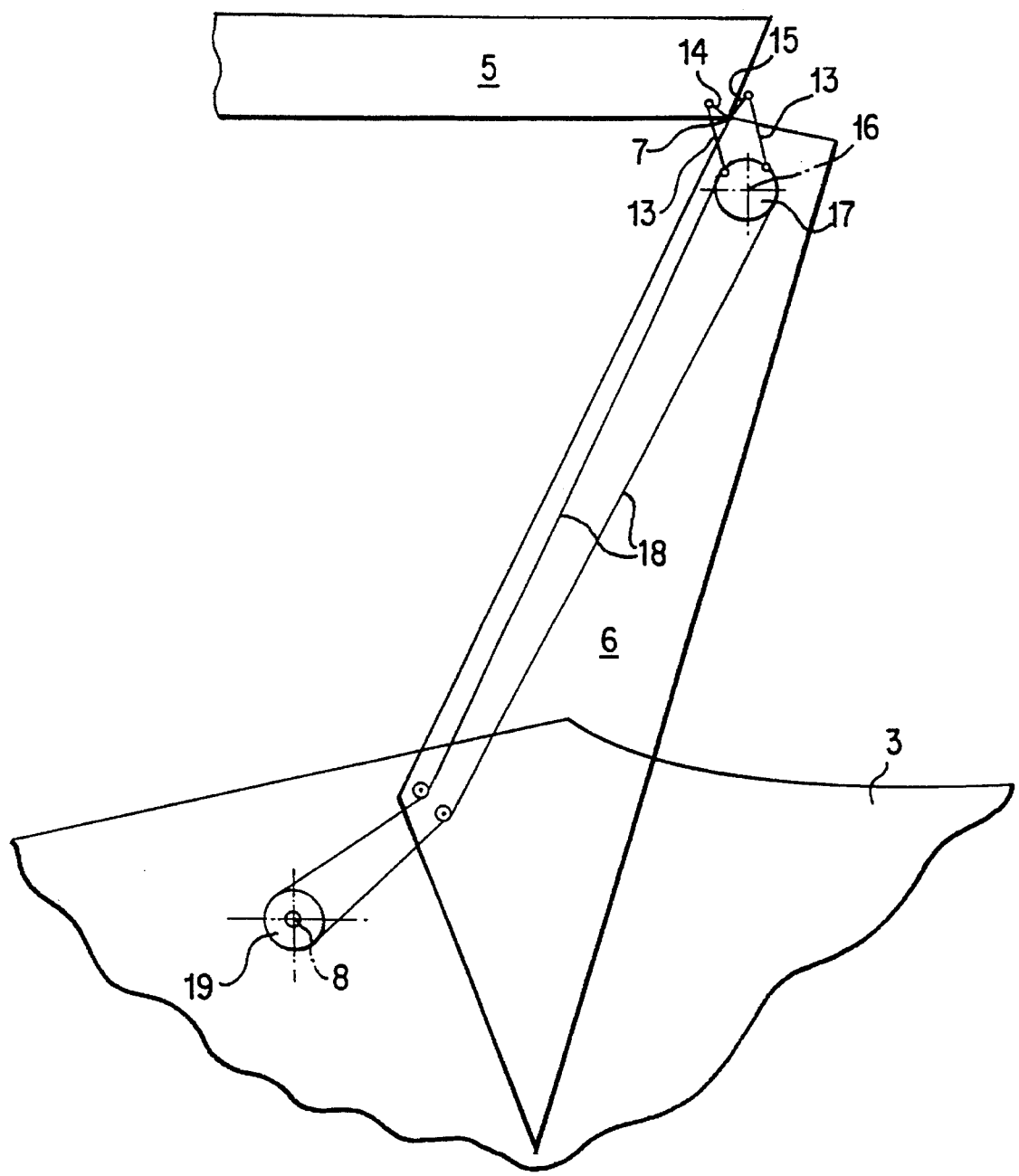
Figure 7:
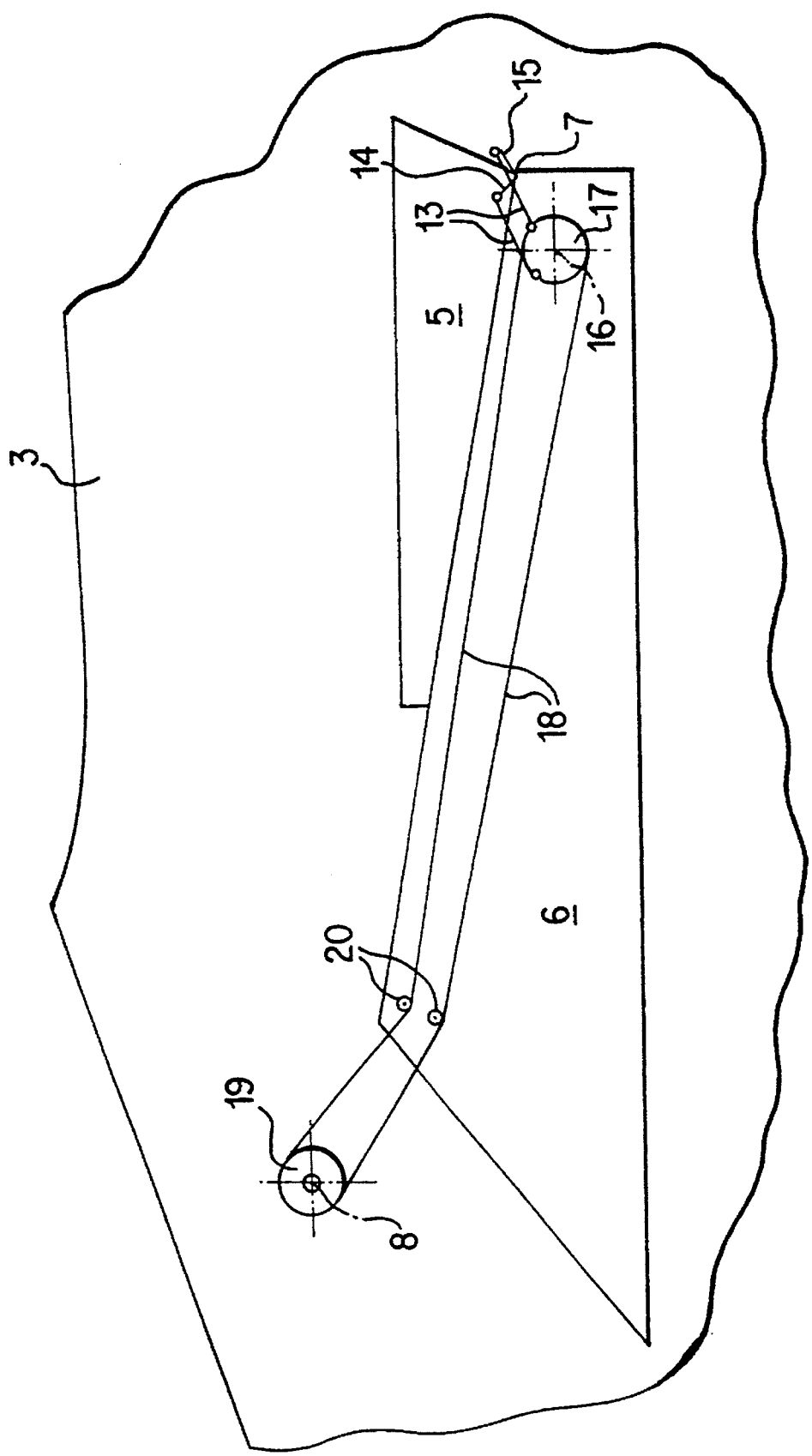
Figure 8:
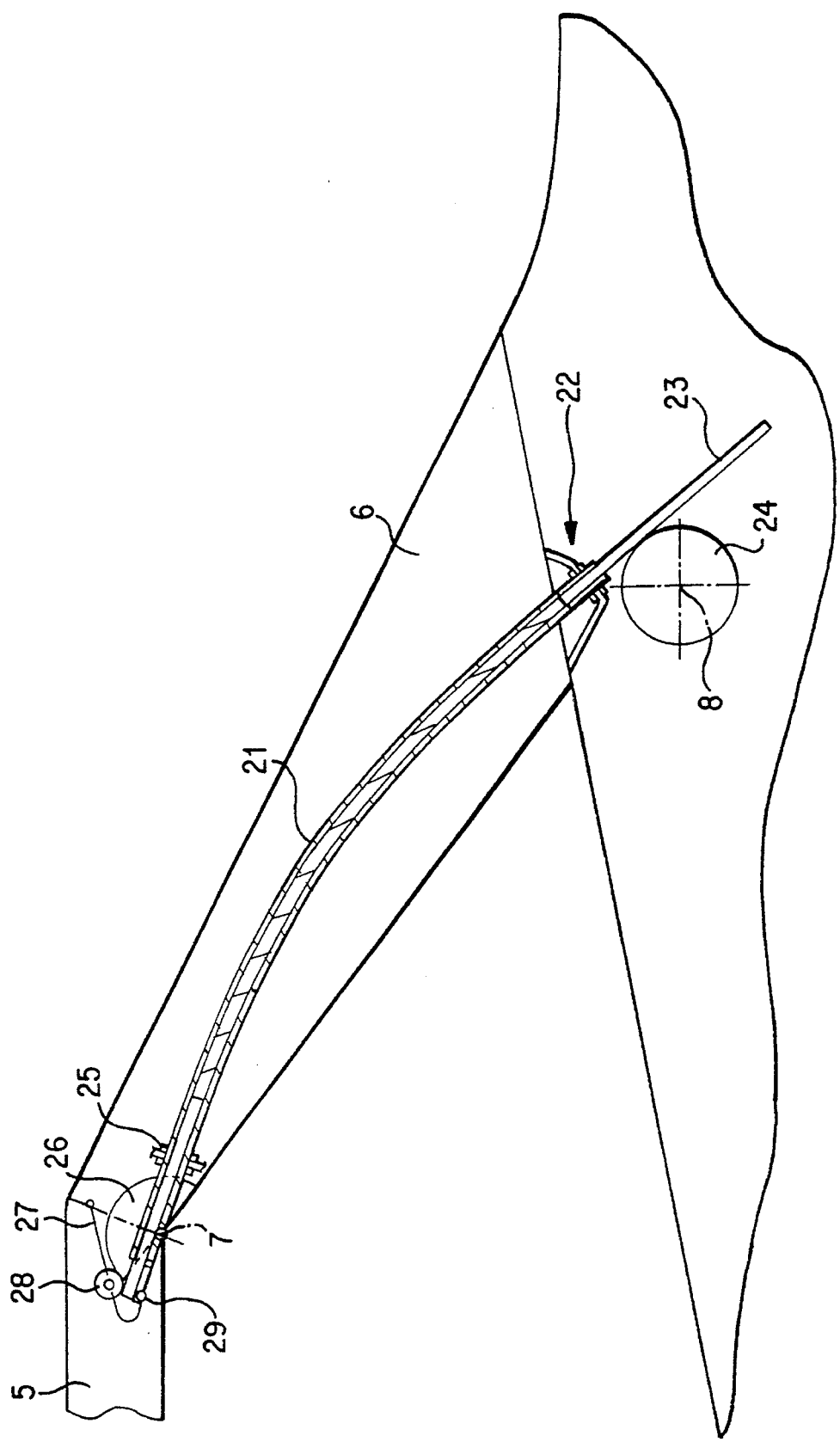
FIGS. 8–10 show representations of various opening positions of the roof construction of a further design of a motor vehicle, in which the forced control of the swivelling movement between the roof part and the rear part takes place by a rack-and pinion drive which absorbs tensile and compressive loads.
Figure 9:
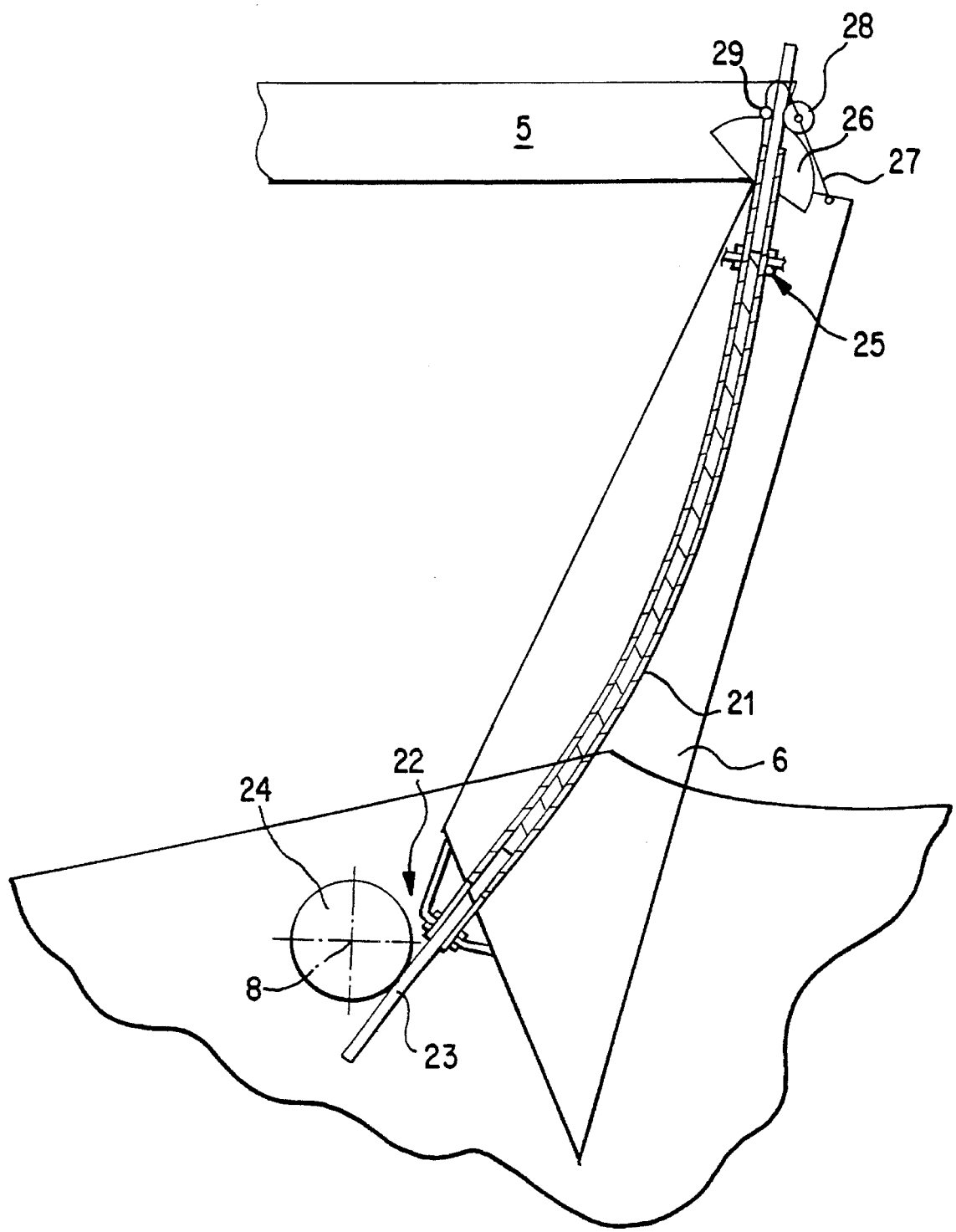
Figure 10:
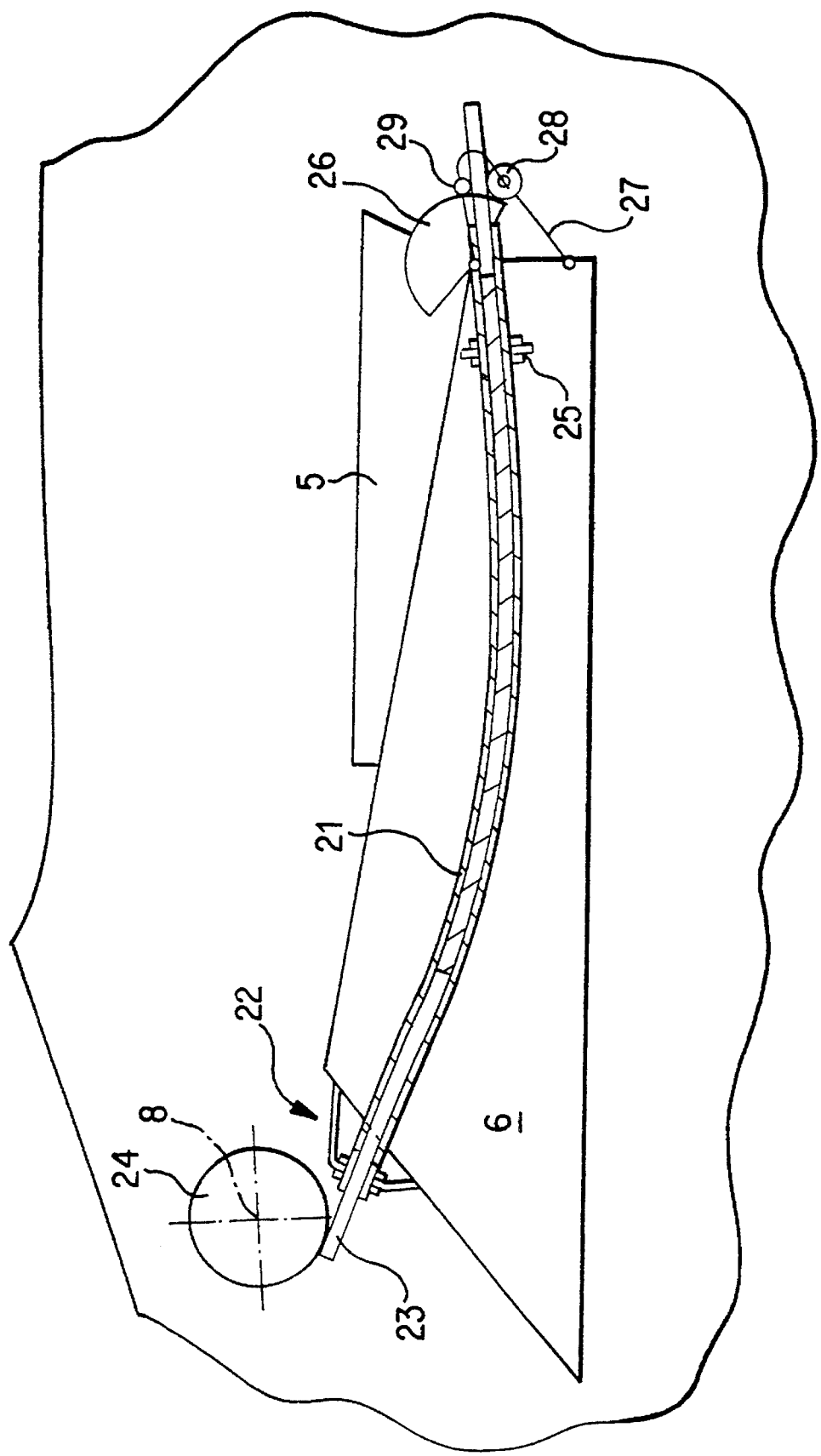

In the case of the design according to FIGS. 5–7, an endless rope pull 18 is likewise provided as the forced control. The rope pull 18 is wrapped around a roller 19 which is fixed to the bodywork and positioned on the rear swivel axis 8. At the other end, the rope pull 18 is wrapped around a roller 17 rotatably mounted about the axis of rotation 16 in an upper region of the rear part 6. The axis of rotation 16 is located at a distance from the roof swivel axis 7 and parallel to the latter. From the roof part 5 there protrudes in a V shaped manner in the region of the roof swivel axis 7 two lever arms 14 and 15, which are rigidly connected to the roof part 5. Articulated at the ends of the two lever arms 14 and 15 in each case is a coupling element 13. The two coupling elements 13 are connected at their opposite ends in a rotationally fixed manner to the roller 17. As can be seen from FIGS. 6 and 7, this design corresponds in its mode of operation to the forced control according to FIGS. 2 to 4. Owing to the relatively large swivelling angle range, the V position of the two lever arms 14 and 15 is mutually at right angles, in order to keep the leverages favorable to a great extent in the torque transfer.

In the case of the design according to FIGS. 8–12, a toothed rack 23 serves to provide force control. The toothed rack 23 is laid in a manner similar to a Bowden wire and is designed for tensile and compressive loads. The toothed rack 23 is laid through the rear part 6 in a sheath 21, which is fixed by means of securing members 22 and 25 in the region of the lower end and upper end of the rear part 6. In the region of the rear swivel axis 8, the toothed rack 23 meshes with a gear wheel 24. The gear wheel 24 is fixed to the bodywork. In the opposite end region near the region of the roof swivel axis 7, the toothed rack 23 meshes with a pinion 28. The pinion 28 is rotatably mounted in an extension arm 27 of the rear part 6. Likewise rotatably mounted in the extension arm 27 is a pressing roller 29, which presses the toothed rack 23 against the pinion 28. The pinion 28 also meshes with the external toothing of an approximately semicircular plate cam 26, which is rigidly connected to the roof part 5. The external toothing of the plate cam 26, which represents a control element of the forced control device, is coaxial with the roof swivel axis 7. The angular range of the external toothing of the plate cam 26 corresponds to the swivelling angle of the roof construction and is slightly less than 180°. The plate cam 26 can therefore be completely accommodated in the contour of the roof construction. During the normal swivelling operation, the toothed rack 23 is subjected only to tensile loading. Only if the roof part 5 attempts to yield to external loads contrary to the normal swivelling movement is the toothed rack 23 also subjected to compressive loading. An advantage of the use of a toothed rack 23 in the form of a Bowden wire laid in the rear part 6 is the easy guidance and transferability of the flow of force with unproblematical adjustability.

Figure 13:
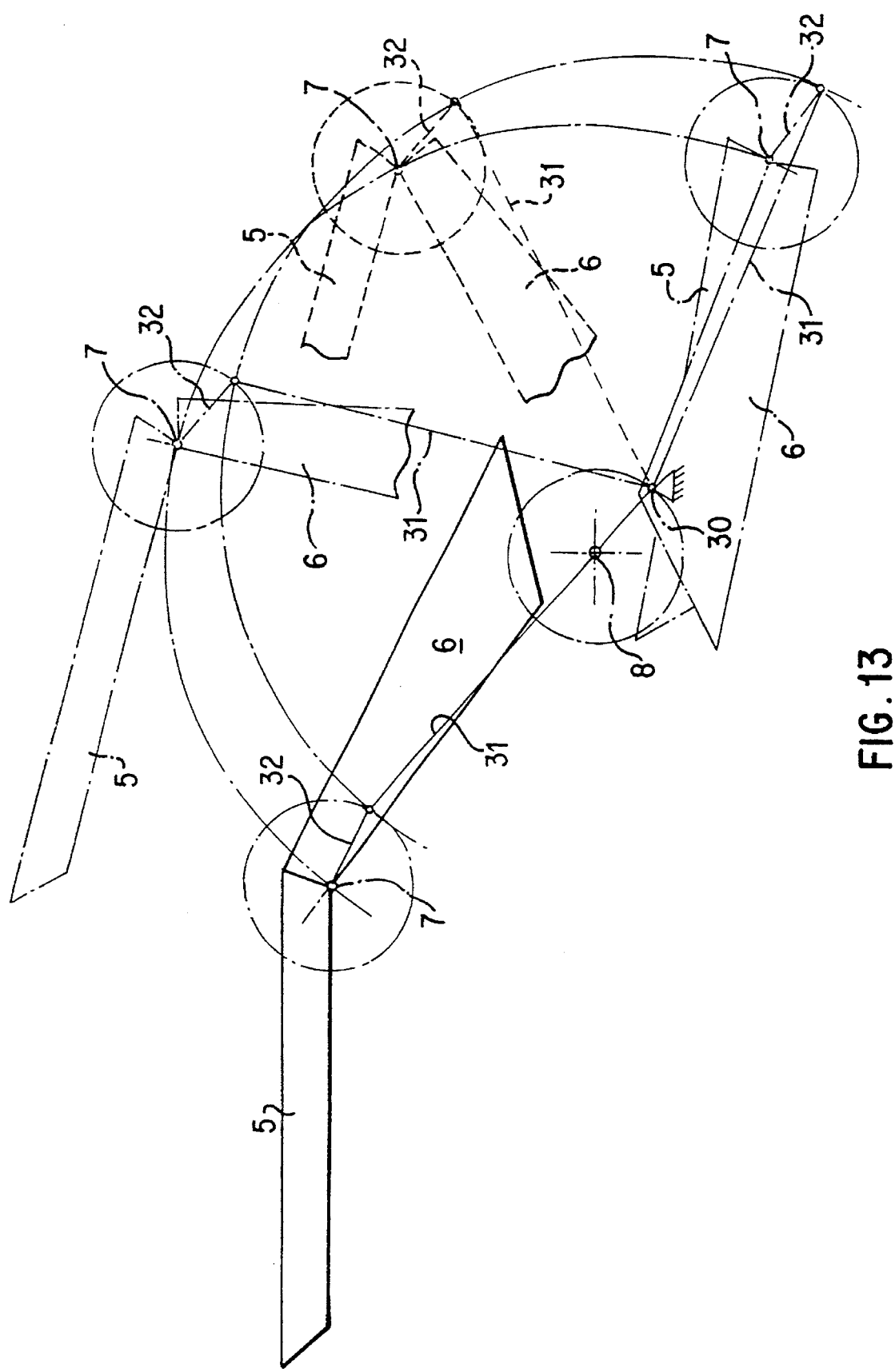
FIG. 13 diagrammatically represents several opening positions of a further design of a roof construction, in which a crank arm mounted in a manner such that it is fixed to the bodywork acts at a distance from the roof swivel axis, forming the connection between the roof part and the rear part, on a lever arm rotationally fixed to the roof part.

In the case of the design according to FIG. 13, a crank arm 31 is mounted in a manner such that it can swivel about an axis 30 fixed to the bodywork. The axis 30 is located at a distance from the rear swivel axis 8 and is parallel to the latter. The crank arm 31 is articulated on a lever continuation 32 of the roof part 5. The lever continuation 32 is rigidly connected to the roof part 5 and protrudes obliquely to the rear, so that it is located inside the outer contour of the roof part 6. In this case the lever continuation 32 commences at the level of the roof swivel axis 7. If the rear part 6 is then swivelled about the rear swivel axis 8, the roof part 5 is inevitably brought by means of the lever arm 31 into the relative positions shown with respect to the rear part 6. The swivelling angle of the rear part 6 is the same in the case of all the embodiments shown and is between 160° and 180°.

Figure 14:
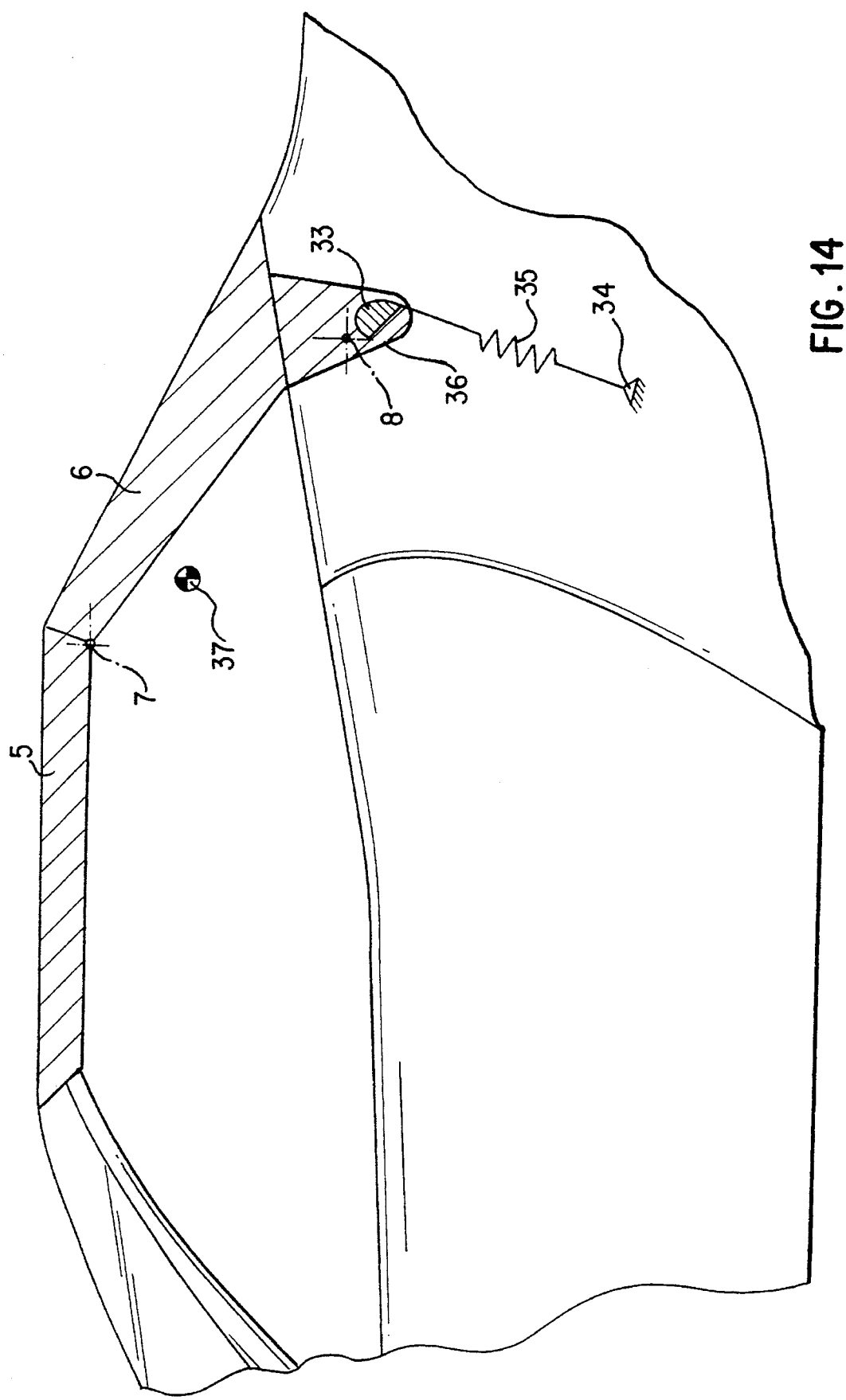
FIG. 14 is a diagrammatic representation of a further embodiment of a motor vehicle with a lowerable roof construction, which is assigned a torque compensating mechanism for producing a defined torque characteristic during opening and closing of the roof construction.

In the case of the design according to FIG. 14, a torque-compensating mechanism is provided for producing a defined torque characteristic during the swivelling operation of the roof part 5 and the rear part 6 about the rear swivel axis 8. For this purpose, a pull rope 35, provided with a spring characteristic, is articulated at a point 34 which is fixed to the bodywork and is at a distance below the rear swivel axis 8. For producing the spring characteristic of the pull rope 35, in the case of the exemplary embodiment there is a spring interposed in the pull rope 35. It is also possible to use a flexible pull rope. At the free end, the pull rope 35 is fastened at a bearing point 36, which is provided on a continuation of the rear part 6. The bearing point 36 is arranged on the continuation at a distance from the rear swivel axis 8 oppositely with respect to the rear part 6. In the direct vicinity of the bearing point 36, the pull rope 35 is deflected by means of a contoured pulley 33, which is likewise fastened on the continuation of the rear part 6 at a distance from the rear swivel axis 8 and approximately oppositely with respect to the rear part 6. This arrangement compensates for any torque which is exerted by the force of gravity of the roof part 5 and of the rear part 6 on the rear swivel axis 8. In the closed position of the roof construction, as shown in FIG. 14, a center of gravity 37 of the roof part 5 and the rear part 6 has the position shown underneath the rear part.

The contour of the contoured pulley 33 is governed by the spring force of the pull rope 35 and the perpendicular distance of the line of spring force action from the rear swivel axis 8 required for the torque to be applied. The counter torque, applied by the pull rope 35 provided with the spring, to the torque applied by the force of gravity of the roof part 5 and the rear part 6 depends on the spring characteristic and the excursion of the spring and consequently also on the unwound rope length of the pull rope 35.

Figure 15:
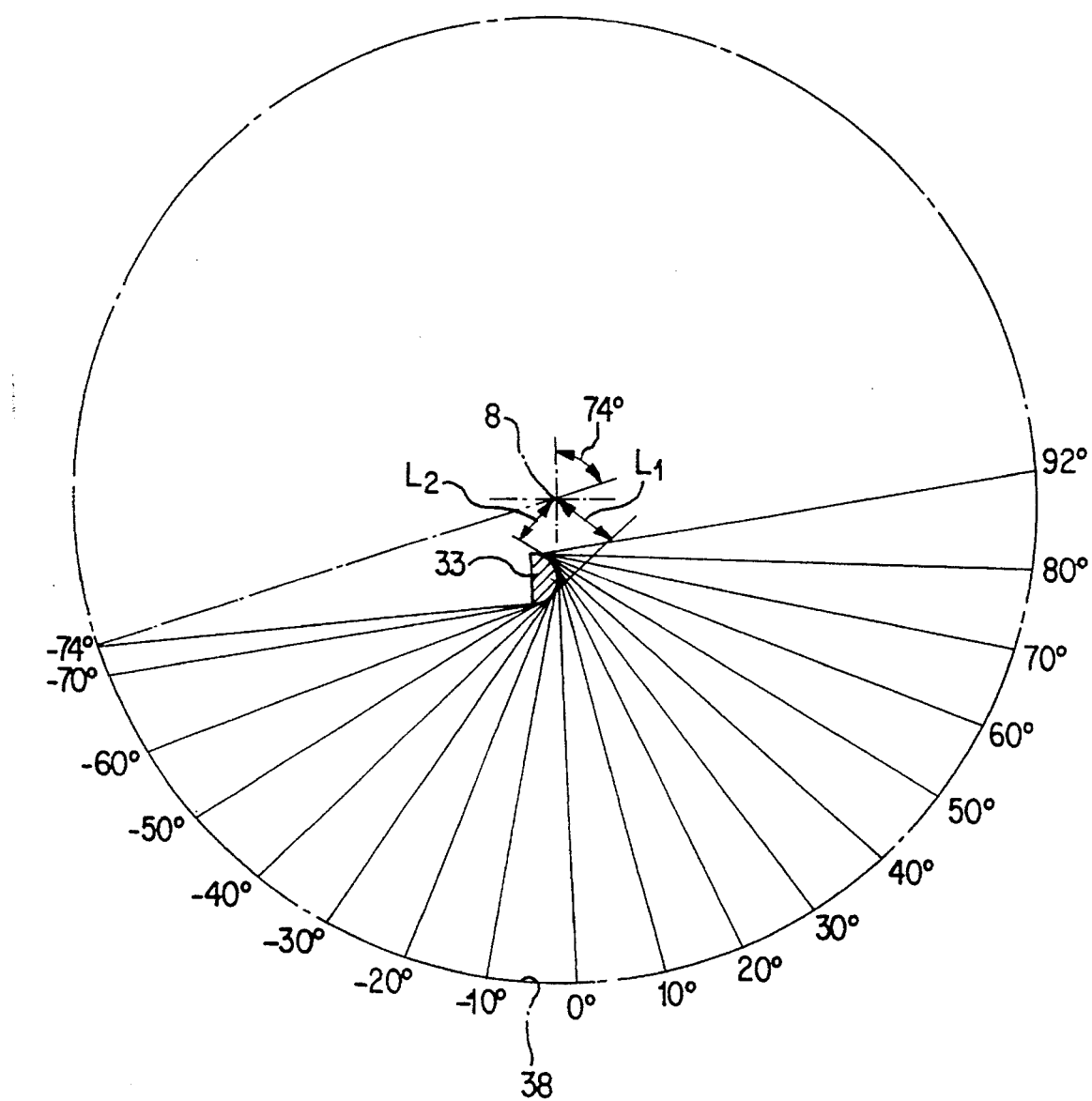
FIG. 15 is a representation of the geometrical construction of the contour of a contoured pulley of the torque-compensating mechanism according to FIG. 14.
Figure 16:
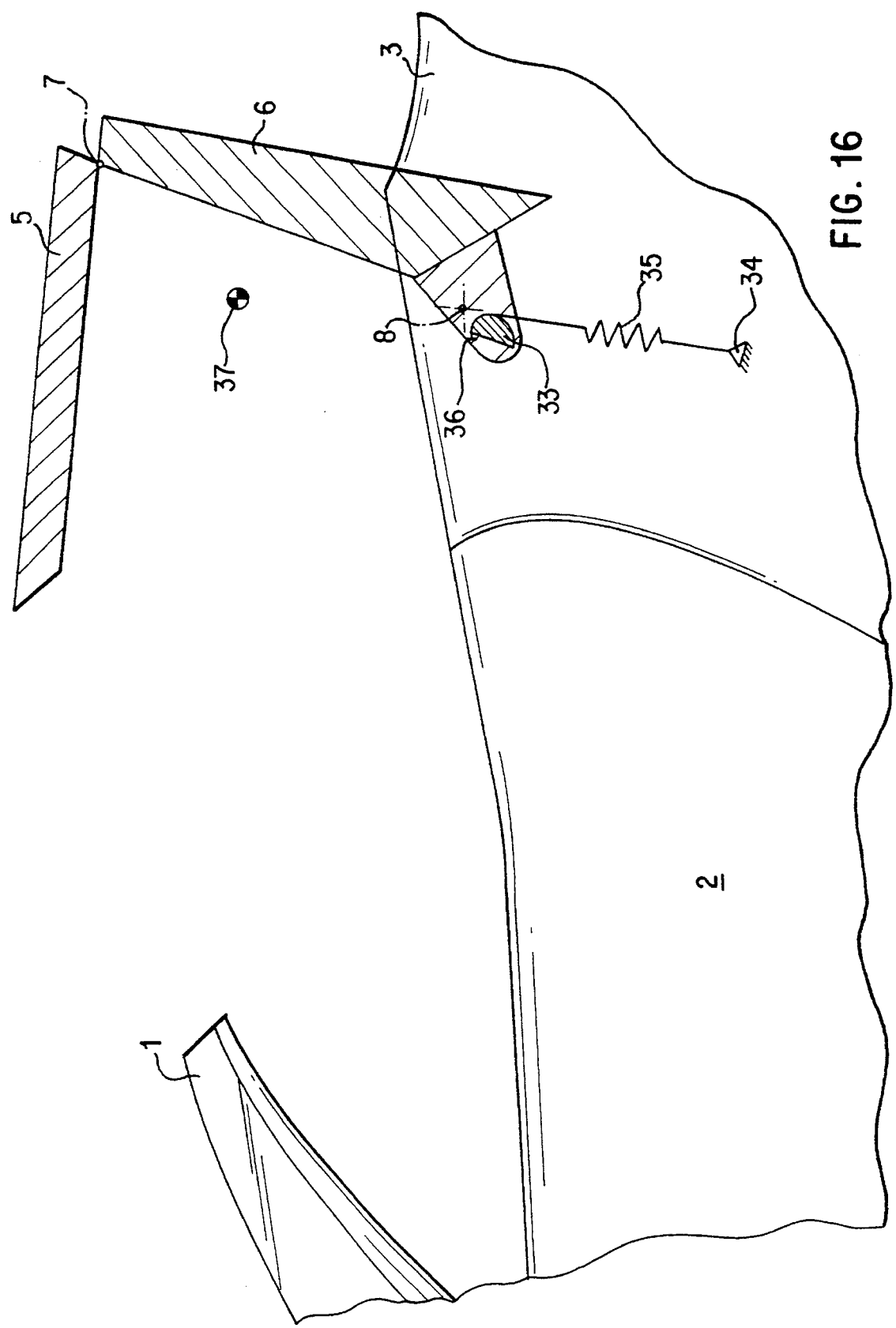
FIGS. 16 and 17 illustrate various opening positions of the roof construction according to FIG. 14.
Figure 17:
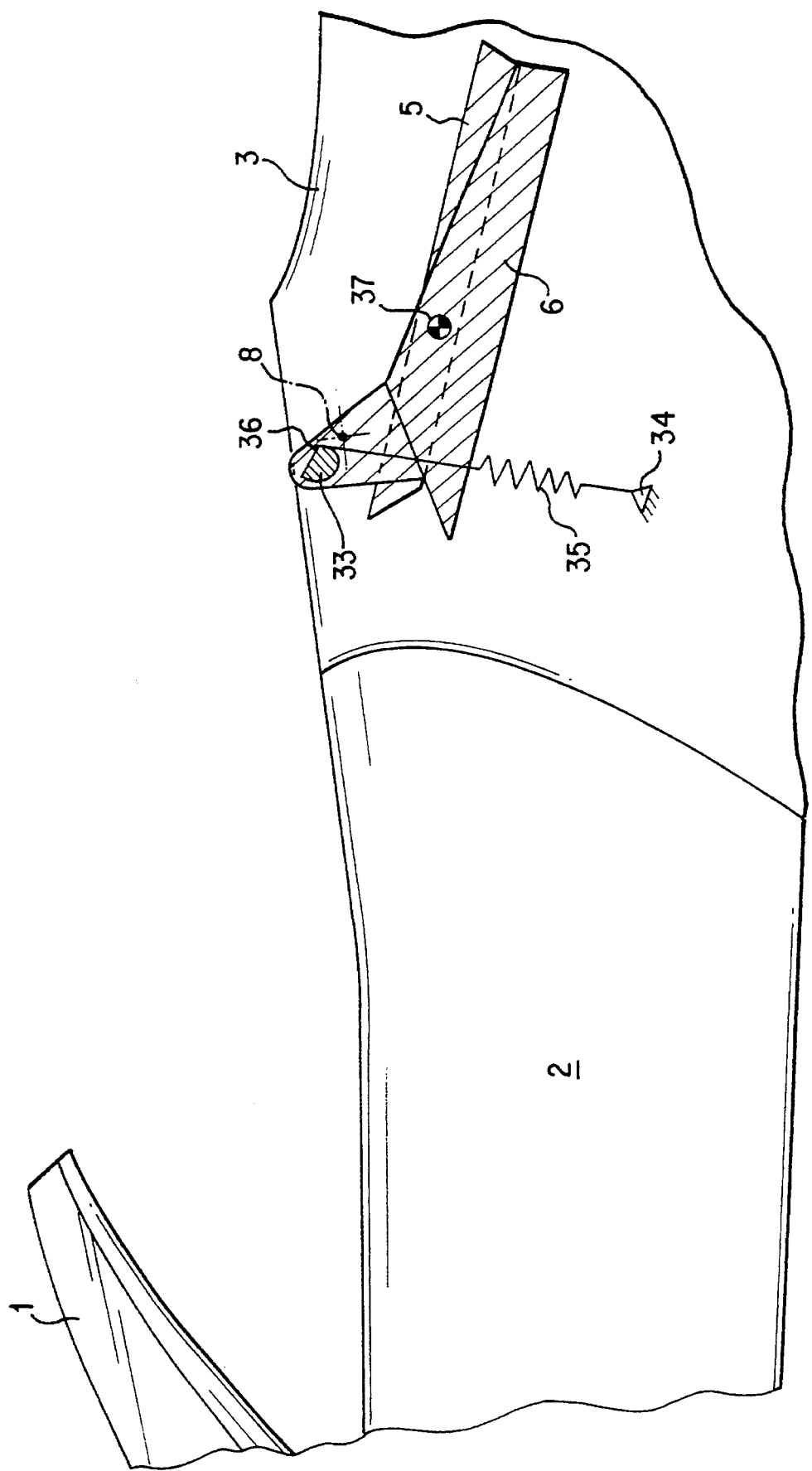

In FIG. 15, the geometrical construction of the contour of the contoured pulley 33 is presented by way of example. A constant, displacement-independent spring force for a predetermined torque characteristic has been chosen. For reasons of technical design, in this case the rear swivel axis 8 and the contoured pulley 33 were chosen as fixed points and the spring suspension point was chosen to be rotated about the rear swivel axis 8. The various possible swivelling angles of the center of gravity 37 of the roof construction between the opened position and the closed position are marked in 10° intervals on a circular path 38. In the case of the exemplary embodiment, the maximum swivelling angle of the center of gravity 37 about the rear swivel axis 8 is 166°. Two perpendicular lengths L1 and L2 are shown in FIG. 15 by way of example. The tangential points produced gives the contour of the contoured pulley 33. As can be seen from FIGS. 16 and 17, in every swivelling position of the roof construction comprising roof part 5 and rear part 6, the pull rope 35, deflected by means of the contoured pulley 33, compensates for the torque applied due to the force of gravity of the construction acting at the center of gravity 37.

Figure 18:
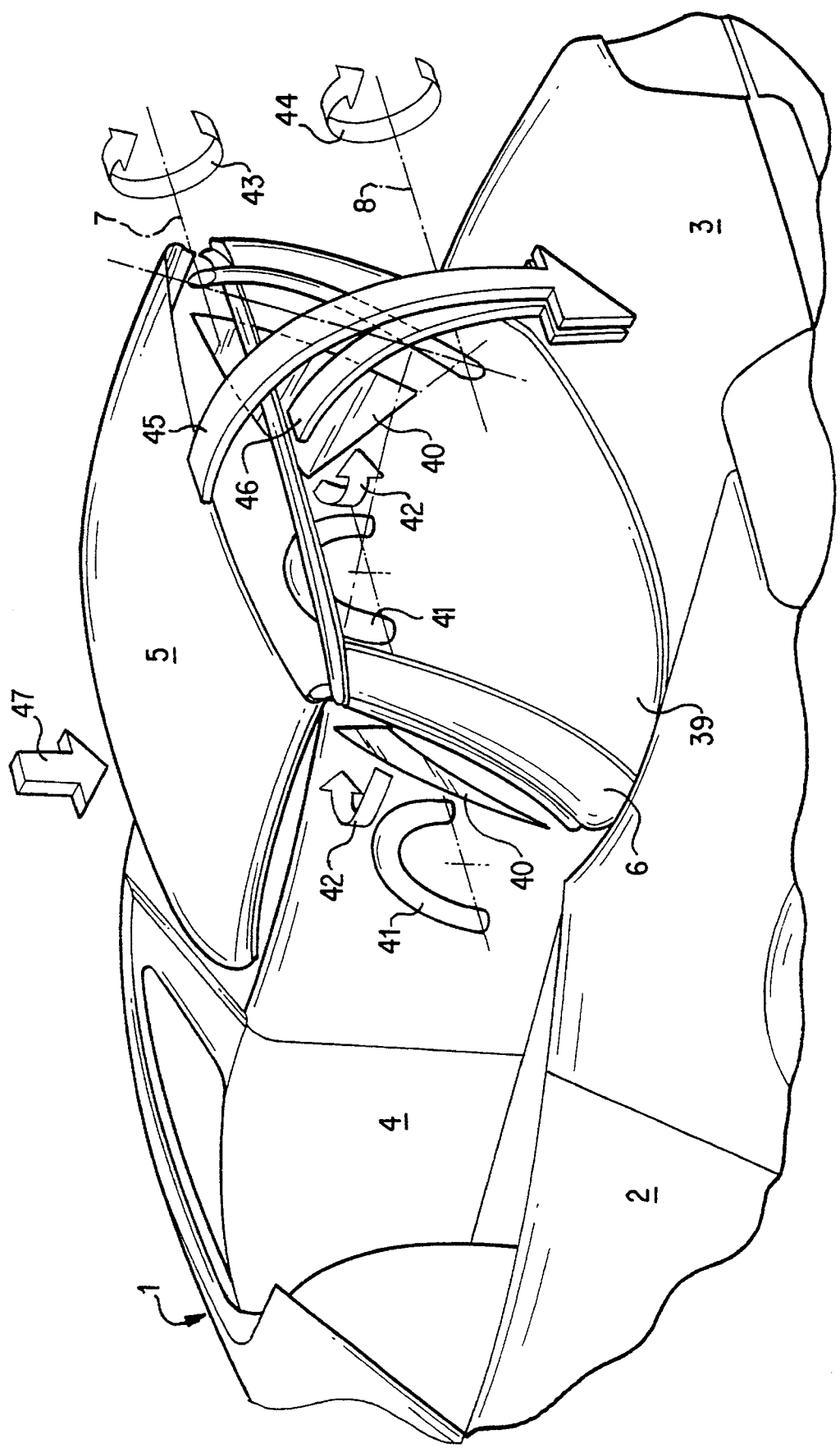
FIG. 18 diagrammatically represents a perspective view of an embodiment of a motor vehicle with a lowerable roof construction, which has not only a roof part and a rear part having the rear window, but also two rear side windows which can be swivelled-in together with the roof part and the rear part and can be lowered in the receiving space behind the passenger compartment.

In the case of the design of the motor vehicle according to FIG. 18, two rollover bars 41 arranged behind the vehicle seats are diagrammatically represented in the passenger compartment 4. The rear part 6 has a rigid rear window 39. In addition to the roof part 5 and the rear part 6, having the rear window 39, a rear side window 40 is provided as a side part on each of both sides of the motor vehicle. These rear side windows 40 are arranged directly in front of the C pillars of the rear part 6 in the travelling direction. In order that the rear side windows 40 are not in the way during the swivelling movement of the rear part 6 in the direction of the arrow 46 and the inevitably accompanying swivelling movement of the roof part 5 in the direction of the arrow 45 and in order that they do not obstruct the lowering operation, the two rear side windows 40 can be swivelled inward in the direction of the arrows 42. In the completely opened state of the roof construction, the two rear side windows 40 lie approximately horizontally between the rear part 6 and the roof part 5. During the opening operation of the roof construction, the swivelling-in of the rear side windows 40 takes place in a manner such that it is coupled with the forced controlled swivelling movements of the roof part 5 and the rear part 6 in the direction of the arrows 43 and 44 about the roof swivel axis 7 and about the rear swivel axis 8, respectively. The swivelling-in and, also the swivelling-out of the rear side windows 40, therefore takes place under forced control with the swivelling movement of the roof construction. Instead of the rear side windows 40, it is also possible to fold in other, non-transparent, load-bearing side parts of the rear part 6.

Figure 19:
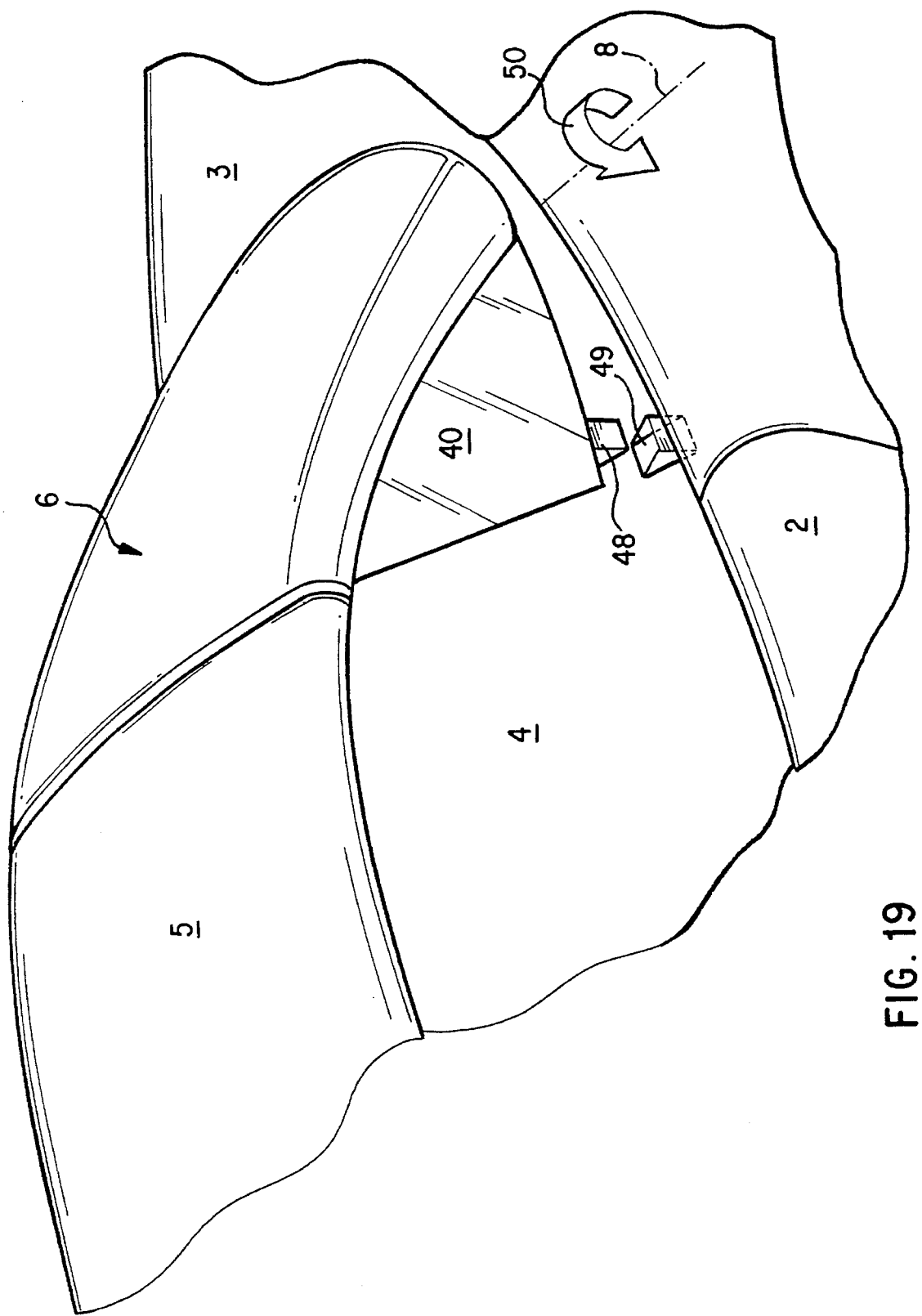
FIG. 19 is a further diagrammatic, perspective cutout of an embodiment of a motor vehicle, in which the rear side windows can be positioned and arrested by wedge elements during closing of the roof construction.

As shown in FIG. 19, during the closing operation of the roof construction in the direction of the arrow 50, in order to overcome sealing forces of seals in the region of the rear side windows 40, and in order to ensure a defined position of the rear side windows 40 in the closed end position, each rear side window 40 has in the region of its front lower end a wedge-shaped piece 48, which slides into a corresponding counterpiece 49 which is fixed to the bodywork.

Figure 20:
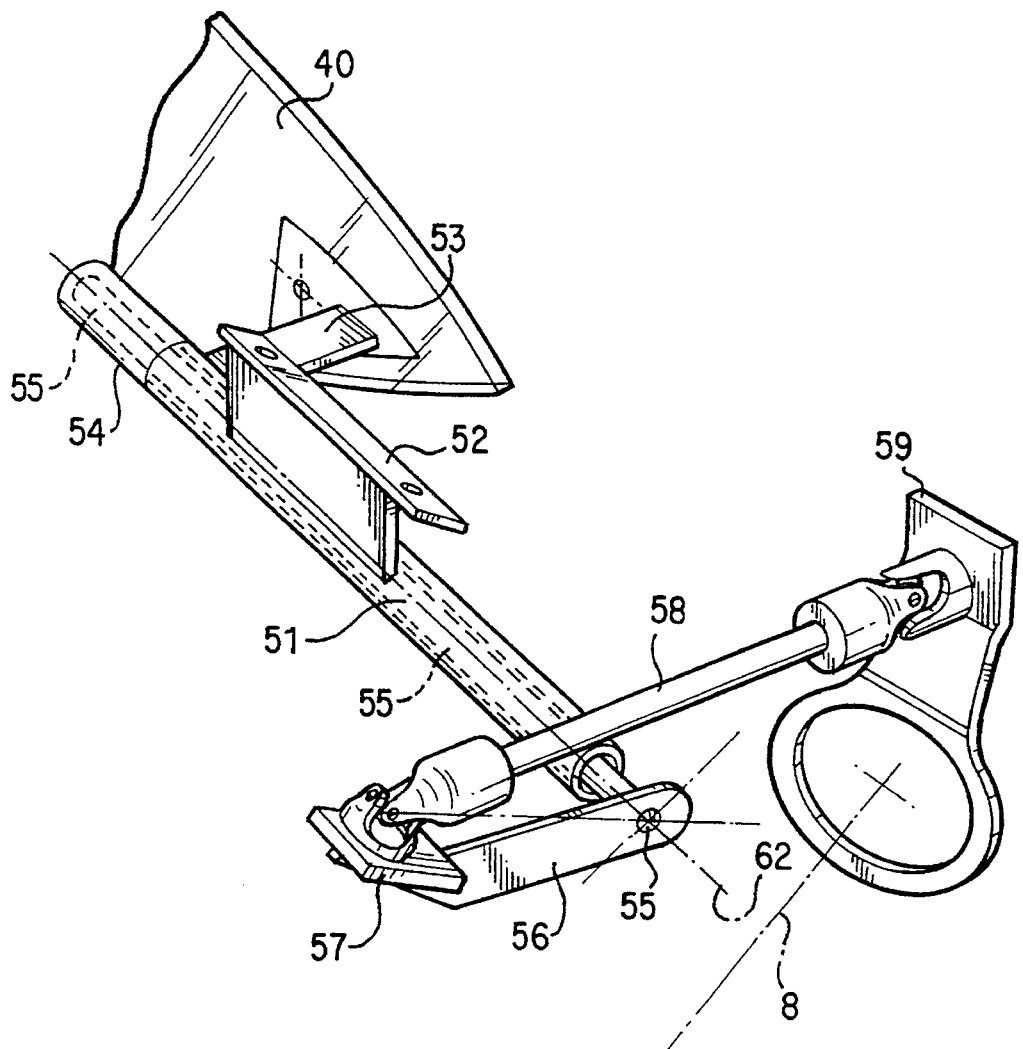
FIG. 20 is a perspective representation of the swivelling drive of a rear side window which is coupled to the swivelling movement of the rear part.
Figure 21:
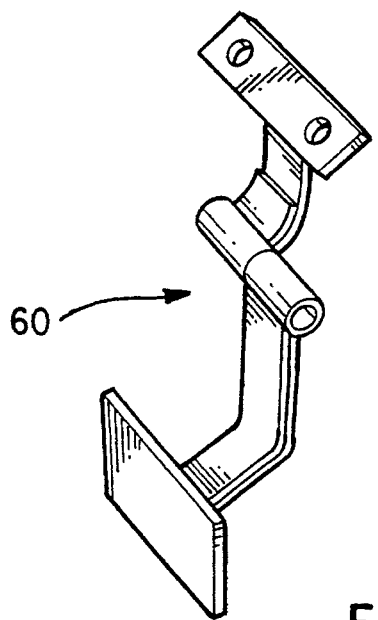
FIG. 21 illustrates a swivelling hinge suitable for the swivelling drive according to FIG. 20, which on one side is fixed on the rear side window and on the other side is connected in a rotationally fixed manner to the rear part.
Figure 22:
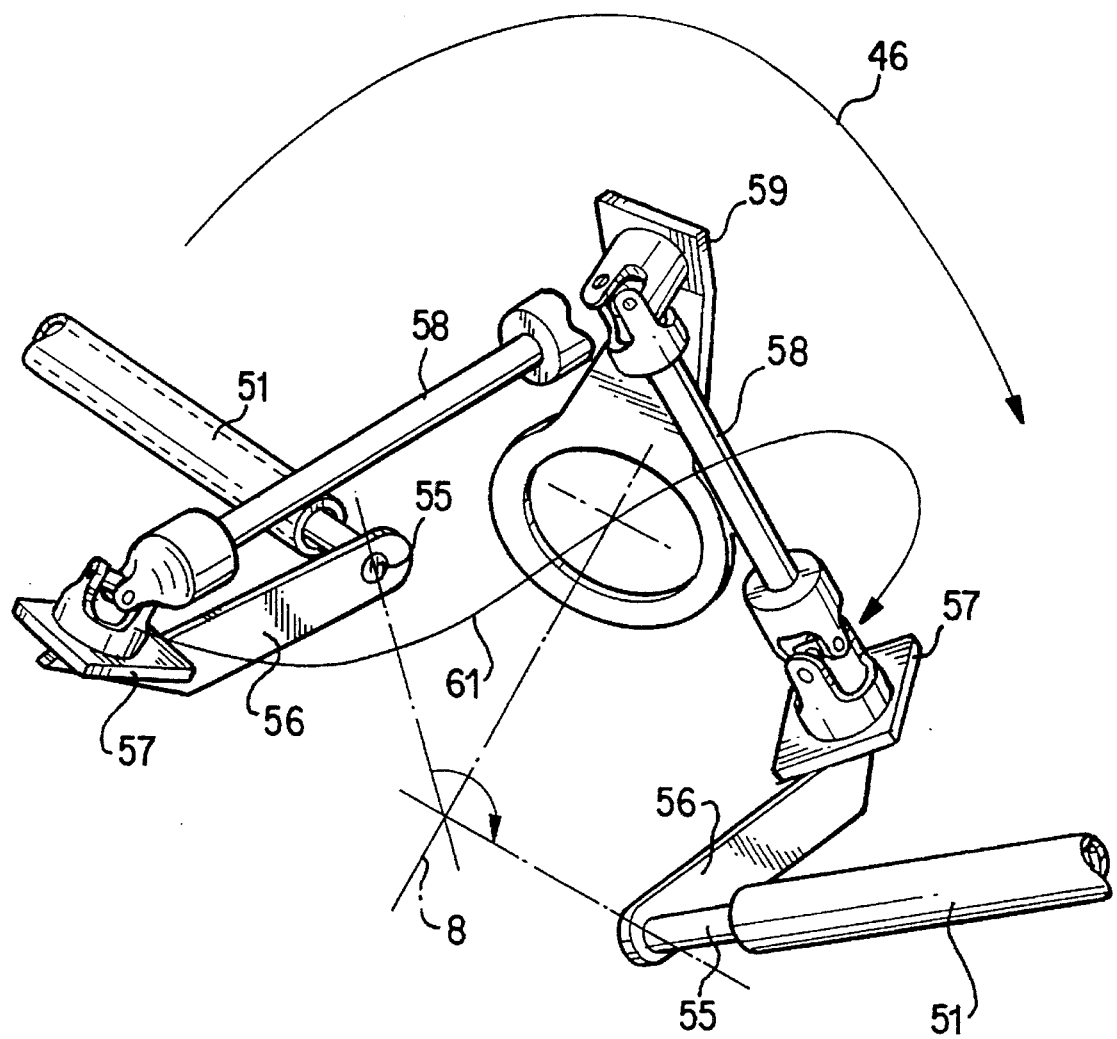
FIG. 22 illustrates the swivelling drive according to FIG. 20, the swivelling drive being represented in the closed position and the open position of the roof construction.

Referring to FIGS. 20 and 21, the swivelling-in and out of the rear side windows 40 takes place in dependence on the swivelling movement of the roof construction by a swivel arm, which is fastened in the form of a hinge 60 on one side on the rear side window 40 and, on the other side, on the rear part 6. The swivel arm is fastened on the rear side window 40 by means of a hinge part 53. The hinge part 53 merges with a sleeve 54. The sleeve 54 is coaxial with a swivel axis 62 of the swivel arm. Connected in a rotationally fixed manner to the sleeve 54 is a shaft 55, which is likewise coaxial with the swivel axis 62 and is mounted in a radially slidingly movable manner in a further sleeve 51 (FIG. 22). Formed on this sleeve 51 is a hinge part 52, which is fastened on the rear part 6. For reasons of overall clarity, this is not shown in FIGS. 20 and 22. At the free end of the shaft 55, opposite from the sleeve 54 and protruding out of the sleeve 51, a radially protruding swivel lever 56 is rigidly connected to the shaft. Fastened at the free end of the lever is a joint plate 57, on which a drag lever 58 is articulated by means of a universal joint. The opposite end of the drag lever 58 is articulated by means of a further universal joint on a butt strap 59 which is fixed to the body work. This point of articulation is located at a distance from the rear swivel axis 8. If the rear part 6 is then swivelled about the rear swivel axis 8, the sleeve 51 is likewise swivelled along with it. During the opening operation of the rear part 6, the point of articulation of the drag lever 58 in the region of the joint plate 57 therefore describes a curved path 61 in the direction of the arrow 46 (FIG. 22). In this case, the lever arm 56 is inevitably swivelled about the swivel axis 62. As a result, the rear side window 40 is swivelled inward by means of the shaft 55 and the sleeve 54. The kinematics can in this case be matched such that the angular velocity of the rear side window 40 is low at the beginning and towards the end of the swivelling operation, but in between has a greater value, so that it does not collide with a roll over bar 41. The higher angular velocity in the inter mediate range has the effect that the rear side window 40 folds-in quickly in this range, so that no contact with the roof part 5 takes place. A further advantage is the dividing-up of the bent-lever effect in the end positions of the rear side window 40.

In the case of an embodiment which is not shown, the coupling of the swivelling movement of the rear side window 40 to the swivelling movement of the rear part 6 takes place by means of a bevel gear mechanism. In this case, instead of the lever arm 56, on the shaft 55 there is mounted a bevel gear, which meshes with a bevel gear coaxial with the rear swivel axis 8.

Figure 23:
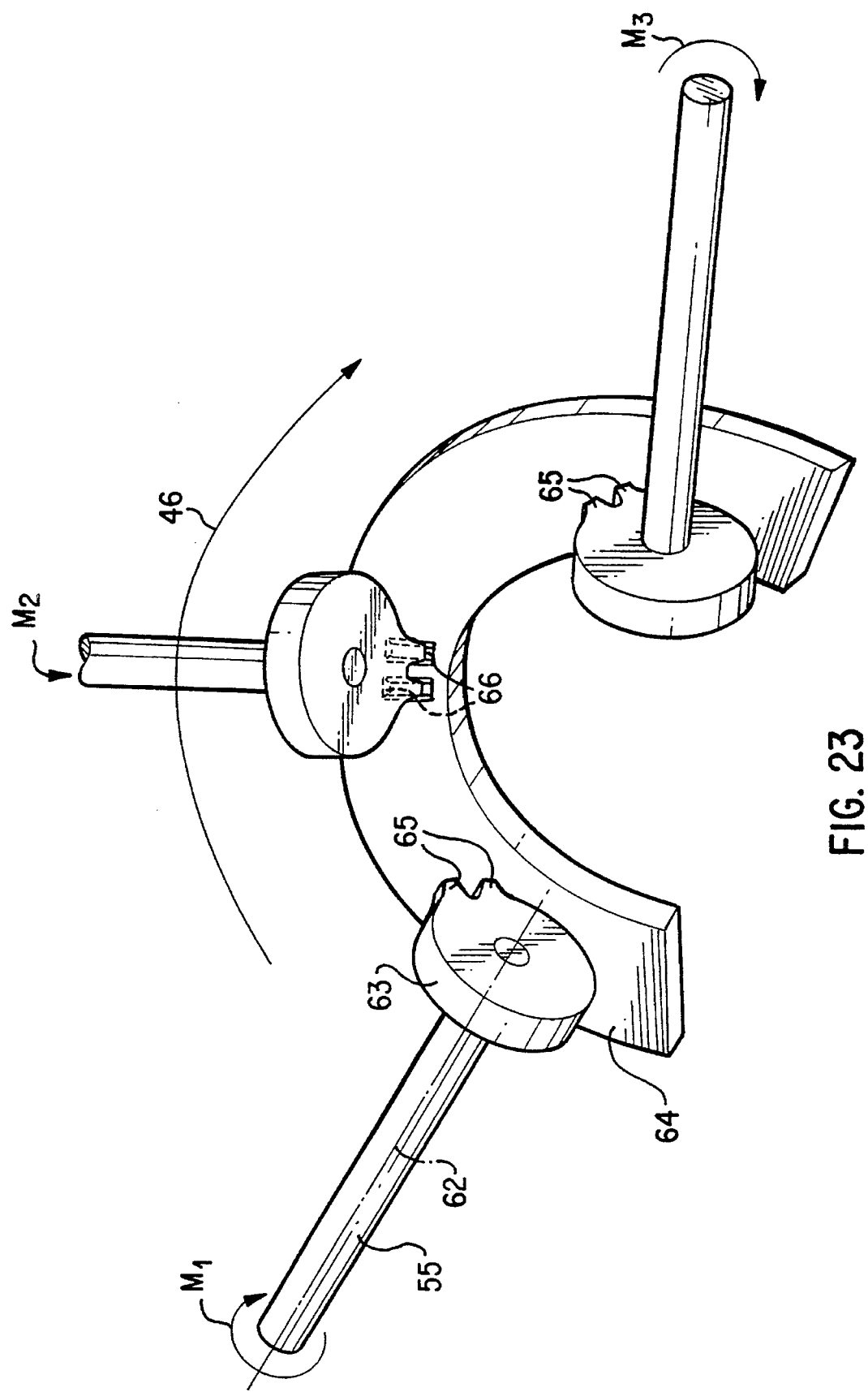
FIG. 23 illustrates another design of a swivelling drive for the swivelling-in and out of a rear side window in dependence on the swivelling movement of the roof construction.
Figure 24:
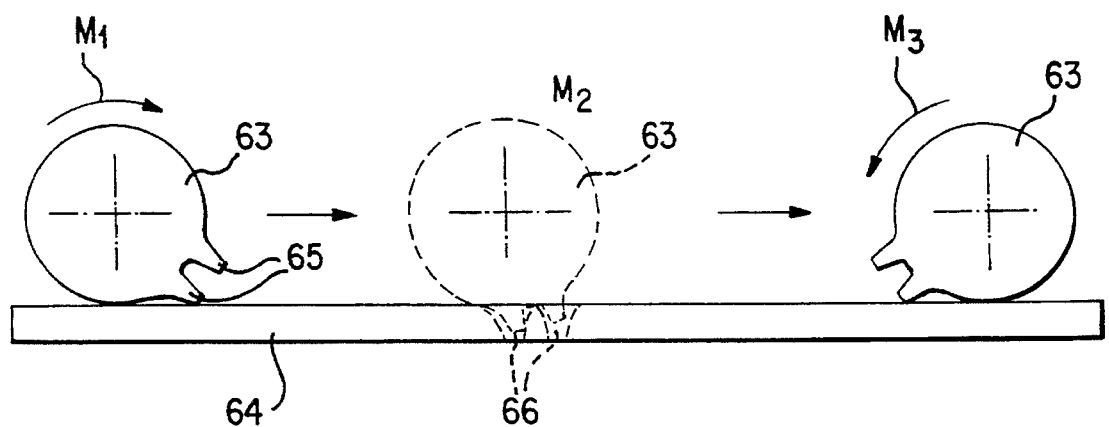
FIG. 24 is a representation of the function of the swivelling drive according to FIG. 23, in which the circular path on which the roller rotationally fixed to the swivel axis of the rear side window slides, is developed as a straight line.

In the case of the design according to FIGS. 23 and 24, instead of a bevel gear, on the shaft 55 of the swivel arm there is coaxially fastened with the swivel axis 62 a wheel 63 which has two mutually neighboring radially protruding teeth 65. During the swivelling movement of the rear part 6 in the direction of the arrow 46, the wheel 63 slides on a planar sliding ring 64, which is arranged in a manner such that it is fixed to the bodywork and is coaxial with the rear swivel axis 8. A spring (not shown) exerts a torque $M_2$ on the shaft 55. Turning of the wheel 63 is prevented by the bearing of the teeth 65 against the surface of the sliding ring 64. In a central position of the rear side window 40, the torque $M_2$ is equal to zero. In this position there are provided in the sliding ring 64 two clearances 66. The clearances 66 correspond to the teeth 65 and are where the teeth 65 engage. The wheel 63 there fore rolls along in this region. The spring acting on the shaft 55 is designed such that, in the closed position of the side window 40, a torque with an opening effect is produced and, in the open position of the rear side window 40, a torque $M_3$ with a closing effect is produced. Turning angle, turning velocity, and point-in-time of the folding-in of the rear side window 40 can be determined by the geometry of the toothing and,by the positioning of the clearances 66 representing mating gaps. If the swivel axis 62 of the swivel arm of the rear side window and the rear swivel axis 8 do not cross, the wheel 63 may also be connected to the swivel axis 62 by means of a flexible shaft.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle with a lowerable roof construction having at least a roof part and a rear part, as well as a roof swivel axis and a rear swivel axis, the rear swivel axis being fixed to the vehicle, comprising:

a forced control device for pivoting said roof part about said roof swivel axis in a predetermined manner of movement with respect to said rear part, said rear part being pivotable about said rear swivel axis, wherein said forced control device comprises a first control element connected in a rotationally fixed manner to said roof part near said roof swivel axis, and a second control element which is fixed to the vehicle near said rear swivel axis, said first and second control elements interacting together to control said predetermined manner of movement, and further comprising two swivelling side parts of the roof construction located on the sides of the vehicle, said two side parts being swivelled transversely with respect to the motor vehicle and being lowerable together with the roof construction, via swivel arms each of which is fastened at one end to a respective side part and on another end to the pivoting movement of the rear part of the roof construction.

2. A motor vehicle according to claim 1, further comprising a torque-compensating mechanism, arranged near the rear swivel axis, for producing a defined torque characteristic during the pivoting movement of said roof part and said rear part.

3. A motor vehicle according to claim 2, wherein a pull rope, which acts on the rear part at a distance from the rear swivel axis, has a spring characteristic and is articulated in a manner such that it is fixed to the vehicle, said pull rope being deflected by a contoured pulley which is rotationally fixed to the rear part and maintains a perpendicular distance between a line of spring force action of the pull rope and the rear swivel axis during the pivoting operation of the rear part.

4. A motor vehicle according to claim 1, wherein said control elements are frictionally or positively interconnected by an endless rope pull or chain pull, respectively.

5. A motor vehicle according to claim 4, wherein said first control element has in a region of the roof part, a roller which is movable about an axis of rotation parallel to the roof swivel axis and offset by a small distance into the rear part and which is connected by a lever linkage in a rotationally fixed manner to the roof part.

6. A motor vehicle according to claim 1, further comprising a toothed rack, which connects said first and second control elements, said toothed rack absorbing tensile and compressive loads.

7. A motor vehicle according to claim 1, further comprising at least one crank arm mounted at a distance from the rear swivel axis in a manner such that it is fixed to the vehicle, a free end of said crank arm acting at a distance from the roof swivel axis on a lever continuation connected rigidly to the roof part.

8. A motor vehicle according to claim 1, wherein each of said two side parts is held on a swivel arm at a distance from its swivel axis, the swivel arm being rotatably mounted about its swivel axis in a mounting fixed on the rear part of the roof construction.

9. A motor vehicle according to claim 8, wherein a coupling element which is articulated in a manner such that it is fixed to the vehicle is coupled to the swivel arm and turns the swivel arm in dependence on the opening or closing movement of the rear part.

10. A motor vehicle according to claim 8, wherein the swivel axis of the swivel arm is assigned a further coupling element which interacts positively or frictionally with a counterelement which is fixed to the vehicle and is coaxial with the rear swivel axis.

* * * * *